US008644292B2

(12) United States Patent
Gorokhov et al.

(10) Patent No.: US 8,644,292 B2
(45) Date of Patent: Feb. 4, 2014

(54) VARIED TRANSMISSION TIME INTERVALS FOR WIRELESS COMMUNICATION SYSTEM

(75) Inventors: Alexei Gorokhov, San Diego, CA (US); Edward H. Teague, San Diego, CA (US); Aamod Khandekar, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 645 days.

(21) Appl. No.: 11/260,932

(22) Filed: Oct. 27, 2005

(65) Prior Publication Data

US 2007/0047485 A1  Mar. 1, 2007

Related U.S. Application Data

(60) Provisional application No. 60/711,145, filed on Aug. 24, 2005.

(51) Int. Cl.
*H04J 3/24* (2006.01)

(52) U.S. Cl.
USPC ........... 370/349; 370/341; 370/348; 370/329; 370/335; 370/491; 370/412; 370/342; 370/441; 455/442; 455/522; 455/452.2; 375/260

(58) Field of Classification Search
USPC ......... 370/468, 329, 349, 341, 348, 335, 491, 370/412, 342, 441; 375/260, 267, 148, 220; 455/442, 522, 452.2
See application file for complete search history.

(56) References Cited

U.S. PATENT DOCUMENTS

| 4,393,276 A | 7/1983 | Steele |
| 4,554,668 A | 11/1985 | Deman et al. |

(Continued)

FOREIGN PATENT DOCUMENTS

| CA | 2348137 | 11/2001 |
| CA | 2477536 | 9/2003 |

(Continued)

OTHER PUBLICATIONS

Lettieri et al., "Adaptive frame length control for improving wireless link throughput, range, and energy efficiency," INFOCOM '98, 17th Annual Joint Conference of the IEEE Computer and Communications Societies, Mar. 29-Apr. 2, 1998, pp. 564-571, vol. 2, IEEE San Francisco, CA, New York, New York.

(Continued)

*Primary Examiner* — Patrick Edouard
*Assistant Examiner* — Fred A Casca
(74) *Attorney, Agent, or Firm* — Mary A. Fales

(57) ABSTRACT

Embodiments describe a varied transmission time interval in wireless communication system. According to some embodiments is a method for assigning a transmission time interval. The method can include measuring a channel condition and/or a data rate of packet communicated by at least one wireless device. Based in part on the data rate and/or channel condition information, a determination can be made whether to schedule a long transmission time interval or a short transmission time interval to the packet. A long transmission time interval can be scheduled if the channel condition is poor and/or there is a low data rate. A short transmission time interval can be scheduled if the channel condition is good and/or the data rate is high or fast. The method can be repeated for multiple wireless devices. Also included is an alternative interlacing structure that supports both long transmission time intervals and short transmission time intervals.

29 Claims, 13 Drawing Sheets

(56) References Cited

U.S. PATENT DOCUMENTS

| | | | |
|---|---|---|---|
| 4,747,137 A | 5/1988 | Matsunaga | |
| 4,783,779 A | 11/1988 | Takahata et al. | |
| 4,783,780 A | 11/1988 | Alexis | |
| 4,975,952 A * | 12/1990 | Mabey et al. | 713/160 |
| 5,008,900 A | 4/1991 | Critchlow et al. | |
| 5,115,248 A | 5/1992 | Roederer et al. | |
| 5,268,694 A | 12/1993 | Jan et al. | |
| 5,282,222 A | 1/1994 | Fattouche et al. | |
| 5,363,408 A | 11/1994 | Paik et al. | |
| 5,371,761 A | 12/1994 | Daffara et al. | |
| 5,384,810 A | 1/1995 | Amrany | |
| 5,406,551 A | 4/1995 | Saito et al. | |
| 5,410,538 A | 4/1995 | Roche et al. | |
| 5,455,839 A | 10/1995 | Eyuboglu | |
| 5,465,253 A | 11/1995 | Rahnema | |
| 5,491,727 A | 2/1996 | Petit | |
| 5,513,379 A | 4/1996 | Benveniste et al. | |
| 5,539,748 A * | 7/1996 | Raith | 370/329 |
| 5,548,582 A | 8/1996 | Brajal et al. | |
| 5,583,869 A | 12/1996 | Grube et al. | |
| 5,594,738 A | 1/1997 | Crisler et al. | |
| 5,604,744 A * | 2/1997 | Andersson et al. | 370/347 |
| 5,612,978 A | 3/1997 | Blanchard et al. | |
| 5,625,876 A | 4/1997 | Gilhousen et al. | |
| 5,684,491 A | 11/1997 | Newman et al. | |
| 5,726,978 A | 3/1998 | Frodigh et al. | |
| 5,732,113 A | 3/1998 | Schmidl et al. | |
| 5,745,487 A | 4/1998 | Hamaki | |
| 5,768,276 A * | 6/1998 | Diachina et al. | 370/432 |
| 5,790,537 A | 8/1998 | Yoon et al. | |
| 5,812,938 A | 9/1998 | Gilhousen et al. | |
| 5,815,488 A | 9/1998 | Williams et al. | |
| 5,822,368 A | 10/1998 | Wang | |
| 5,838,268 A | 11/1998 | Frenkel | |
| 5,867,478 A | 2/1999 | Baum et al. | |
| 5,870,393 A | 2/1999 | Yano et al. | |
| 5,887,023 A | 3/1999 | Mabuchi | |
| 5,907,585 A | 5/1999 | Suzuki et al. | |
| 5,920,571 A | 7/1999 | Houck et al. | |
| 5,926,470 A | 7/1999 | Tiedemann, Jr. | |
| 5,933,421 A | 8/1999 | Alamouti et al. | |
| 5,949,814 A | 9/1999 | Odenwalder et al. | |
| 5,953,325 A | 9/1999 | Willars | |
| 5,955,992 A | 9/1999 | Shattil | |
| 5,956,642 A | 9/1999 | Larsson et al. | |
| 5,995,992 A | 11/1999 | Eckard et al. | |
| 5,999,826 A | 12/1999 | Whinnett | |
| 6,002,942 A | 12/1999 | Park et al. | |
| 6,016,123 A | 1/2000 | Barton et al. | |
| 6,038,150 A | 3/2000 | Yee et al. | |
| 6,038,263 A | 3/2000 | Kotzin et al. | |
| 6,038,450 A | 3/2000 | Brink et al. | |
| 6,052,364 A | 4/2000 | Chalmers et al. | |
| 6,061,337 A | 5/2000 | Light et al. | |
| 6,067,315 A | 5/2000 | Sandin | |
| 6,075,350 A | 6/2000 | Peng et al. | |
| 6,075,797 A | 6/2000 | Thomas | |
| 6,076,114 A | 6/2000 | Wesley | |
| 6,088,345 A | 7/2000 | Sakoda et al. | |
| 6,108,323 A | 8/2000 | Gray | |
| 6,108,550 A | 8/2000 | Wiorek et al. | |
| 6,112,094 A | 8/2000 | Dent | |
| 6,128,776 A | 10/2000 | Kang et al. | |
| 6,138,037 A | 10/2000 | Jaamies | |
| 6,141,317 A | 10/2000 | Marchok et al. | |
| 6,154,484 A | 11/2000 | Lee et al. | |
| 6,169,910 B1 | 1/2001 | Tamil et al. | |
| 6,175,550 B1 | 1/2001 | Van Nee | |
| 6,175,650 B1 | 1/2001 | Sindhu et al. | |
| 6,176,550 B1 | 1/2001 | Lamart et al. | |
| 6,198,775 B1 | 3/2001 | Khayrallah et al. | |
| 6,215,983 B1 | 4/2001 | Dogan et al. | |
| 6,226,280 B1 | 5/2001 | Roark et al. | |
| 6,232,918 B1 | 5/2001 | Wax et al. | |
| 6,240,129 B1 | 5/2001 | Reusens et al. | |
| 6,249,683 B1 | 6/2001 | Lundby et al. | |
| 6,256,478 B1 | 7/2001 | Allen et al. | |
| 6,271,946 B1 | 8/2001 | Chang et al. | |
| 6,272,122 B1 | 8/2001 | Wee et al. | |
| 6,310,704 B1 | 10/2001 | Dogan et al. | |
| 6,317,435 B1 | 11/2001 | Tiedemann, Jr. et al. | |
| 6,335,922 B1 | 1/2002 | Tiedemann, Jr. et al. | |
| 6,337,659 B1 | 1/2002 | Kim et al. | |
| 6,337,983 B1 | 1/2002 | Bonta et al. | |
| 6,353,637 B1 | 3/2002 | Mansour et al. | |
| 6,363,060 B1 | 3/2002 | Sarkar | |
| 6,374,115 B1 | 4/2002 | Barnes et al. | |
| 6,377,539 B1 | 4/2002 | Kang et al. | |
| 6,377,809 B1 | 4/2002 | Rezaiifar et al. | |
| 6,388,998 B1 | 5/2002 | Kasturia | |
| 6,393,008 B1 | 5/2002 | Cheng et al. | |
| 6,393,012 B1 | 5/2002 | Pankaj | |
| 6,401,062 B1 | 6/2002 | Murashima | |
| 6,438,369 B1 | 8/2002 | Huang et al. | |
| 6,449,246 B1 | 9/2002 | Barton et al. | |
| 6,466,800 B1 | 10/2002 | Sydon et al. | |
| 6,473,467 B1 | 10/2002 | Wallace et al. | |
| 6,477,317 B1 | 11/2002 | Itokawa | |
| 6,478,422 B1 | 11/2002 | Hansen | |
| 6,483,820 B1 | 11/2002 | Davidson et al. | |
| 6,487,243 B1 | 11/2002 | Hwang et al. | |
| 6,496,790 B1 | 12/2002 | Kathavate et al. | |
| 6,501,810 B1 | 12/2002 | Karim et al. | |
| 6,507,601 B2 | 1/2003 | Parsa et al. | |
| 6,519,462 B1 | 2/2003 | Lu et al. | |
| 6,529,525 B1 | 3/2003 | Pecen et al. | |
| 6,535,666 B1 | 3/2003 | Dogan et al. | |
| 6,539,008 B1 | 3/2003 | Ahn et al. | |
| 6,539,213 B1 | 3/2003 | Richards et al. | |
| 6,542,485 B1 | 4/2003 | Mujtaba | |
| 6,542,743 B1 | 4/2003 | Soliman | |
| 6,563,806 B1 | 5/2003 | Yano et al. | |
| 6,563,881 B1 | 5/2003 | Sakoda et al. | |
| 6,577,739 B1 | 6/2003 | Hurtig et al. | |
| 6,584,140 B1 | 6/2003 | Lee | |
| 6,590,881 B1 | 7/2003 | Wallace et al. | |
| 6,597,746 B1 | 7/2003 | Amrany et al. | |
| 6,601,206 B1 | 7/2003 | Marvasti | |
| 6,614,857 B1 | 9/2003 | Buehrer et al. | |
| 6,625,172 B2 | 9/2003 | Odenwalder et al. | |
| 6,636,568 B2 | 10/2003 | Kadous | |
| 6,654,339 B1 | 11/2003 | Bohnke et al. | |
| 6,654,431 B1 | 11/2003 | Barton et al. | |
| 6,657,949 B1 | 12/2003 | Jones, IV et al. | |
| 6,658,258 B1 | 12/2003 | Chen et al. | |
| 6,674,787 B1 | 1/2004 | Dick et al. | |
| 6,674,810 B1 | 1/2004 | Cheng | |
| 6,675,012 B2 | 1/2004 | Gray et al. | |
| 6,678,318 B1 | 1/2004 | Lai | |
| 6,690,951 B1 | 2/2004 | Cuffaro et al. | |
| 6,701,165 B1 | 3/2004 | Ho et al. | |
| 6,704,571 B1 | 3/2004 | Moon | |
| 6,711,400 B1 | 3/2004 | Aura et al. | |
| 6,721,568 B1 | 4/2004 | Gustavsson et al. | |
| 6,724,719 B1 | 4/2004 | Tong et al. | |
| 6,731,602 B1 | 5/2004 | Watanabe et al. | |
| 6,735,244 B1 | 5/2004 | Hasegawa et al. | |
| 6,744,743 B2 | 6/2004 | Walton et al. | |
| 6,751,456 B2 | 6/2004 | Bilgic | |
| 6,754,511 B1 | 6/2004 | Halford et al. | |
| 6,776,165 B2 | 8/2004 | Jin | |
| 6,776,765 B2 | 8/2004 | Soukup et al. | |
| 6,785,341 B2 | 8/2004 | Walton et al. | |
| 6,798,736 B1 | 9/2004 | Black et al. | |
| 6,799,043 B2 | 9/2004 | Tiedemann, Jr. et al. | |
| 6,804,307 B1 | 10/2004 | Popovic | |
| 6,813,284 B2 | 11/2004 | Vayanos et al. | |
| 6,821,535 B2 | 11/2004 | Nurmi et al. | |
| 6,828,293 B1 | 12/2004 | Hazenkamp et al. | |
| 6,829,293 B2 | 12/2004 | Jones et al. | |
| 6,831,943 B1 | 12/2004 | Dabak et al. | |
| 6,842,487 B1 | 1/2005 | Larsson | |
| 6,850,481 B2 | 2/2005 | Wu et al. | |
| 6,850,509 B2 | 2/2005 | Lee et al. | |

(56) References Cited

U.S. PATENT DOCUMENTS

| | | |
|---|---|---|
| 6,904,097 B2 | 6/2005 | Agami et al. |
| 6,904,283 B2 | 6/2005 | Li et al. |
| 6,907,020 B2 | 6/2005 | Periyalwar et al. |
| 6,907,269 B2 | 6/2005 | Yamaguchi et al. |
| 6,909,797 B2 | 6/2005 | Romsdahl et al. |
| 6,917,602 B2 | 7/2005 | Toskala et al. |
| 6,917,821 B2 | 7/2005 | Kadous et al. |
| 6,927,728 B2 | 8/2005 | Vook et al. |
| 6,934,266 B2 | 8/2005 | Dulin et al. |
| 6,934,275 B1 | 8/2005 | Love et al. |
| 6,934,340 B1 | 8/2005 | Dollard |
| 6,940,827 B2 | 9/2005 | Li et al. |
| 6,940,842 B2 | 9/2005 | Proctor, Jr. |
| 6,940,845 B2 | 9/2005 | Benveniste |
| 6,954,448 B2 | 10/2005 | Farley et al. |
| 6,954,481 B1 | 10/2005 | Laroia et al. |
| 6,954,622 B2 | 10/2005 | Nelson et al. |
| 6,961,364 B1 | 11/2005 | Laroia et al. |
| 6,963,543 B2 | 11/2005 | Diep et al. |
| 6,970,682 B2 | 11/2005 | Crilly, Jr. et al. |
| 6,975,868 B2 | 12/2005 | Joshi et al. |
| 6,980,540 B1 | 12/2005 | Laroia et al. |
| 6,985,434 B2 | 1/2006 | Wu et al. |
| 6,985,453 B2 | 1/2006 | Lundby et al. |
| 6,985,466 B1 | 1/2006 | Yun et al. |
| 6,985,498 B2 | 1/2006 | Laroia et al. |
| 6,987,746 B1 | 1/2006 | Song |
| 7,002,900 B2 | 2/2006 | Walton et al. |
| 7,006,848 B2 | 2/2006 | Ling et al. |
| 7,009,500 B2 | 3/2006 | Rao et al. |
| 7,016,318 B2 | 3/2006 | Pankaj et al. |
| 7,016,319 B2 | 3/2006 | Baum et al. |
| 7,023,880 B2 | 4/2006 | El-Maleh et al. |
| 7,039,356 B2 | 5/2006 | Nguyen |
| 7,039,370 B2 | 5/2006 | Laroia et al. |
| 7,042,857 B2 | 5/2006 | Krishnan et al. |
| 7,050,402 B2 | 5/2006 | Schmidl et al. |
| 7,050,405 B2 | 5/2006 | Attar et al. |
| 7,050,759 B2 | 5/2006 | Gaal et al. |
| 7,079,867 B2 | 7/2006 | Chun et al. |
| 7,085,574 B2 | 8/2006 | Gaal et al. |
| 7,095,708 B1 | 8/2006 | Alamouti et al. |
| 7,099,630 B2 | 8/2006 | Brunner et al. |
| 7,103,384 B2 | 9/2006 | Chun |
| 7,106,319 B2 | 9/2006 | Ishiyama |
| 7,120,134 B2 | 10/2006 | Tiedemann, Jr. et al. |
| 7,120,395 B2 | 10/2006 | Tong et al. |
| 7,126,928 B2 | 10/2006 | Tiedemann, Jr. et al. |
| 7,131,086 B2 | 10/2006 | Yamasaki et al. |
| 7,142,864 B2 | 11/2006 | Laroia et al. |
| 7,145,940 B2 | 12/2006 | Gore et al. |
| 7,149,199 B2 | 12/2006 | Sung et al. |
| 7,151,761 B1 | 12/2006 | Palenius |
| 7,155,236 B2 | 12/2006 | Chen et al. |
| 7,157,351 B2 | 1/2007 | Cheng et al. |
| 7,164,649 B2 | 1/2007 | Walton et al. |
| 7,164,696 B2 | 1/2007 | Sano et al. |
| 7,170,937 B2 | 1/2007 | Zhou |
| 7,177,297 B2 | 2/2007 | Agrawal et al. |
| 7,177,351 B2 | 2/2007 | Kadous |
| 7,181,170 B2 | 2/2007 | Love et al. |
| 7,184,713 B2 | 2/2007 | Kadous et al. |
| 7,188,300 B2 | 3/2007 | Eriksson et al. |
| 7,197,282 B2 | 3/2007 | Dent et al. |
| 7,209,712 B2 | 4/2007 | Holtzman |
| 7,215,979 B2 | 5/2007 | Nakagawa et al. |
| 7,230,942 B2 | 6/2007 | Laroia et al. |
| 7,233,634 B1 | 6/2007 | Hassell Sweatman et al. |
| 7,248,841 B2 | 7/2007 | Agee et al. |
| 7,254,158 B2 | 8/2007 | Agrawal |
| 7,257,167 B2 | 8/2007 | Lau |
| 7,260,153 B2 | 8/2007 | Nissani |
| 7,289,585 B2 | 10/2007 | Sandhu et al. |
| 7,290,195 B2 | 10/2007 | Guo et al. |
| 7,292,651 B2 | 11/2007 | Li |
| 7,295,509 B2 | 11/2007 | Laroia et al. |
| 7,313,086 B2 | 12/2007 | Aizawa |
| 7,313,126 B2 | 12/2007 | Yun et al. |
| 7,313,174 B2 | 12/2007 | Alard et al. |
| 7,313,407 B2 | 12/2007 | Shapira |
| 7,327,812 B2 | 2/2008 | Auer |
| 7,330,701 B2 | 2/2008 | Mukkavilli et al. |
| 7,336,727 B2 | 2/2008 | Mukkavilli et al. |
| 7,349,371 B2 | 3/2008 | Schein |
| 7,349,667 B2 | 3/2008 | Magee et al. |
| 7,356,000 B2 | 4/2008 | Oprescu-Surcobe et al. |
| 7,356,005 B2 | 4/2008 | Derryberry et al. |
| 7,356,073 B2 | 4/2008 | Heikkila |
| 7,359,327 B2 | 4/2008 | Oshiba |
| 7,363,055 B2 | 4/2008 | Castrogiovanni et al. |
| 7,366,223 B1 | 4/2008 | Chen et al. |
| 7,366,253 B2 | 4/2008 | Kim et al. |
| 7,366,520 B2 | 4/2008 | Haustein et al. |
| 7,369,531 B2 | 5/2008 | Cho et al. |
| 7,372,911 B1 | 5/2008 | Lindskog et al. |
| 7,372,912 B2 | 5/2008 | Seo et al. |
| 7,379,489 B2 | 5/2008 | Zuniga et al. |
| 7,382,764 B2 | 6/2008 | Uehara |
| 7,392,014 B2 | 6/2008 | Baker et al. |
| 7,394,865 B2 | 7/2008 | Borran et al. |
| 7,403,745 B2 | 7/2008 | Dominique et al. |
| 7,403,748 B1 | 7/2008 | Keskitalo et al. |
| 7,405,119 B2 | 7/2008 | Yamano et al. |
| 7,406,336 B2 | 7/2008 | Astely et al. |
| 7,411,898 B2 | 8/2008 | Erlich et al. |
| 7,412,212 B2 | 8/2008 | Hottinen |
| 7,418,043 B2 | 8/2008 | Shattil |
| 7,418,246 B2 | 8/2008 | Kim et al. |
| 7,423,991 B2 | 9/2008 | Cho et al. |
| 7,426,426 B2 | 9/2008 | Van Baren et al. |
| 7,428,426 B2 | 9/2008 | Kiran et al. |
| 7,433,661 B2 | 10/2008 | Kogiantis et al. |
| 7,437,164 B2 | 10/2008 | Agrawal et al. |
| 7,443,835 B2 | 10/2008 | Lakshmi Narayanan et al. |
| 7,447,270 B1 | 11/2008 | Hottinen |
| 7,450,548 B2 | 11/2008 | Haustein et al. |
| 7,460,466 B2 | 12/2008 | Lee et al. |
| 7,463,698 B2 | 12/2008 | Fujii et al. |
| 7,468,943 B2 | 12/2008 | Gu et al. |
| 7,471,963 B2 | 12/2008 | Kim et al. |
| 7,483,408 B2 | 1/2009 | Bevan et al. |
| 7,486,408 B2 | 2/2009 | Van Der Schaar et al. |
| 7,486,735 B2 | 2/2009 | Dubuc et al. |
| 7,492,788 B2 | 2/2009 | Zhang et al. |
| 7,499,393 B2 | 3/2009 | Ozluturk |
| 7,508,748 B2 | 3/2009 | Kadous |
| 7,508,842 B2 | 3/2009 | Baum et al. |
| 7,512,096 B2 | 3/2009 | Kuzminskiy et al. |
| 7,548,506 B2 | 6/2009 | Ma et al. |
| 7,551,546 B2 | 6/2009 | Ma et al. |
| 7,551,564 B2 | 6/2009 | Mattina |
| 7,558,293 B2 | 7/2009 | Choi et al. |
| 7,567,621 B2 | 7/2009 | Sampath et al. |
| 7,573,900 B2 | 8/2009 | Kim et al. |
| 7,599,327 B2 | 10/2009 | Zhuang |
| 7,616,955 B2 | 11/2009 | Kim et al. |
| 7,627,051 B2 | 12/2009 | Shen et al. |
| 7,664,061 B2 | 2/2010 | Hottinen |
| 7,676,007 B1 | 3/2010 | Choi et al. |
| 7,684,507 B2 | 3/2010 | Levy |
| 7,724,777 B2 | 5/2010 | Sutivong et al. |
| 7,768,979 B2 | 8/2010 | Sutivong et al. |
| 7,916,624 B2 | 3/2011 | Laroia et al. |
| 7,924,699 B2 | 4/2011 | Laroia et al. |
| 7,990,843 B2 | 8/2011 | Laroia et al. |
| 7,990,844 B2 | 8/2011 | Laroia et al. |
| 8,014,271 B2 | 9/2011 | Laroia et al. |
| 8,045,512 B2 | 10/2011 | Khandekar et al. |
| 8,095,141 B2 | 1/2012 | Teague |
| 8,098,568 B2 | 1/2012 | Laroia et al. |
| 8,098,569 B2 | 1/2012 | Laroia et al. |
| 8,199,634 B2 | 6/2012 | Laroia et al. |
| 8,218,425 B2 | 7/2012 | Laroia et al. |
| 8,223,627 B2 | 7/2012 | Laroia et al. |

(56) References Cited

U.S. PATENT DOCUMENTS

| | | |
|---|---|---|
| 8,295,154 B2 | 10/2012 | Laroia et al. |
| 8,446,892 B2 | 5/2013 | Ji et al. |
| 8,462,859 B2 | 6/2013 | Sampath et al. |
| 2001/0021650 A1 | 9/2001 | Bilgic et al. |
| 2001/0024427 A1 | 9/2001 | Suzuki |
| 2001/0030948 A1 | 10/2001 | Tiedemann, Jr. |
| 2001/0047424 A1 | 11/2001 | Alastalo et al. |
| 2001/0053140 A1 | 12/2001 | Choi et al. |
| 2001/0055294 A1 | 12/2001 | Motoyoshi |
| 2001/0055297 A1 | 12/2001 | Benveniste et al. |
| 2002/0000948 A1 | 1/2002 | Chun et al. |
| 2002/0015405 A1 | 2/2002 | Sepponen et al. |
| 2002/0018157 A1 | 2/2002 | Zhang et al. |
| 2002/0039912 A1 | 4/2002 | Yamaguchi et al. |
| 2002/0044524 A1 | 4/2002 | Laroia et al. |
| 2002/0058525 A1 | 5/2002 | Kasapi et al. |
| 2002/0061742 A1 | 5/2002 | Lapaille et al. |
| 2002/0077152 A1 | 6/2002 | Johnson et al. |
| 2002/0085521 A1 | 7/2002 | Tripathi et al. |
| 2002/0090004 A1 | 7/2002 | Rinchiuso |
| 2002/0090024 A1 | 7/2002 | Tan |
| 2002/0101839 A1 | 8/2002 | Farley et al. |
| 2002/0122381 A1 | 9/2002 | Wu et al. |
| 2002/0122403 A1 | 9/2002 | Hashem et al. |
| 2002/0128035 A1 | 9/2002 | Jokinen et al. |
| 2002/0147953 A1 | 10/2002 | Catreux et al. |
| 2002/0159422 A1 | 10/2002 | Li et al. |
| 2002/0160769 A1 | 10/2002 | Gray et al. |
| 2002/0160781 A1 | 10/2002 | Bark et al. |
| 2002/0168946 A1 | 11/2002 | Aizawa et al. |
| 2002/0172293 A1 | 11/2002 | Kuchi et al. |
| 2002/0176398 A1 | 11/2002 | Nidda |
| 2002/0181571 A1 | 12/2002 | Yamano et al. |
| 2002/0191569 A1 | 12/2002 | Sung et al. |
| 2002/0193146 A1 | 12/2002 | Wallace et al. |
| 2003/0002464 A1 | 1/2003 | Rezaiifar et al. |
| 2003/0020651 A1 | 1/2003 | Crilly, Jr. et al. |
| 2003/0035491 A1 | 2/2003 | Walton et al. |
| 2003/0036359 A1 | 2/2003 | Dent et al. |
| 2003/0040283 A1 | 2/2003 | Kawai et al. |
| 2003/0043732 A1 | 3/2003 | Walton et al. |
| 2003/0043764 A1 | 3/2003 | Kim et al. |
| 2003/0063579 A1 | 4/2003 | Lee |
| 2003/0068983 A1 | 4/2003 | Kim et al. |
| 2003/0072254 A1 | 4/2003 | Ma et al. |
| 2003/0072255 A1 | 4/2003 | Ma et al. |
| 2003/0072280 A1 | 4/2003 | McFarland et al. |
| 2003/0072395 A1 | 4/2003 | Jia et al. |
| 2003/0073409 A1 | 4/2003 | Nobukiyo et al. |
| 2003/0073464 A1 | 4/2003 | Giannakis et al. |
| 2003/0076890 A1 | 4/2003 | Hochwald et al. |
| 2003/0086371 A1 | 5/2003 | Walton et al. |
| 2003/0086393 A1 | 5/2003 | Vasudevan et al. |
| 2003/0096579 A1 | 5/2003 | Ito et al. |
| 2003/0103520 A1 | 6/2003 | Chen et al. |
| 2003/0109226 A1 | 6/2003 | Brunner et al. |
| 2003/0109266 A1 | 6/2003 | Rafiah et al. |
| 2003/0112745 A1 | 6/2003 | Zhuang et al. |
| 2003/0125040 A1 | 7/2003 | Walton et al. |
| 2003/0128658 A1 | 7/2003 | Walton et al. |
| 2003/0133426 A1 | 7/2003 | Schein et al. |
| 2003/0142648 A1 | 7/2003 | Semper |
| 2003/0142729 A1 | 7/2003 | Subrahmanya et al. |
| 2003/0147371 A1 | 8/2003 | Choi et al. |
| 2003/0161281 A1 | 8/2003 | Dulin et al. |
| 2003/0161282 A1 | 8/2003 | Medvedev et al. |
| 2003/0165189 A1 | 9/2003 | Kadous et al. |
| 2003/0181170 A1 | 9/2003 | Sim |
| 2003/0185310 A1 | 10/2003 | Ketchum et al. |
| 2003/0190897 A1 | 10/2003 | Lei et al. |
| 2003/0193915 A1 | 10/2003 | Lee et al. |
| 2003/0202491 A1 | 10/2003 | Tiedemann, Jr. et al. |
| 2003/0202560 A1 | 10/2003 | Tiedemann, Jr. et al. |
| 2003/0216156 A1 | 11/2003 | Chun et al. |
| 2003/0228850 A1 | 12/2003 | Hwang |
| 2003/0235255 A1 | 12/2003 | Ketchum et al. |
| 2004/0001429 A1 | 1/2004 | Ma et al. |
| 2004/0001460 A1 | 1/2004 | Bevan et al. |
| 2004/0002364 A1 | 1/2004 | Trikkonen et al. |
| 2004/0009783 A1 | 1/2004 | Miyoshi et al. |
| 2004/0010623 A1 | 1/2004 | Sher et al. |
| 2004/0015692 A1 | 1/2004 | Green et al. |
| 2004/0017785 A1 | 1/2004 | Zelst |
| 2004/0032443 A1 | 2/2004 | Moylan et al. |
| 2004/0042558 A1 | 3/2004 | Hwang et al. |
| 2004/0048609 A1 | 3/2004 | Kosaka |
| 2004/0048630 A1 | 3/2004 | Shapira et al. |
| 2004/0054999 A1 | 3/2004 | Willen et al. |
| 2004/0057394 A1 | 3/2004 | Holtzman et al. |
| 2004/0058687 A1 | 3/2004 | Kim et al. |
| 2004/0066754 A1 | 4/2004 | Hottinen et al. |
| 2004/0066761 A1 | 4/2004 | Giannakis et al. |
| 2004/0067756 A1 | 4/2004 | Wager et al. |
| 2004/0072565 A1 | 4/2004 | Nobukiyo et al. |
| 2004/0076185 A1 | 4/2004 | Kim et al. |
| 2004/0077379 A1 | 4/2004 | Smith et al. |
| 2004/0081073 A1 | 4/2004 | Walton et al. |
| 2004/0081195 A1 | 4/2004 | El-Maleh et al. |
| 2004/0087325 A1 | 5/2004 | Cheng et al. |
| 2004/0095907 A1 | 5/2004 | Agee et al. |
| 2004/0097215 A1 | 5/2004 | Abe et al. |
| 2004/0097240 A1 | 5/2004 | Chen et al. |
| 2004/0098505 A1 | 5/2004 | Clemmensen |
| 2004/0105489 A1 | 6/2004 | Kim et al. |
| 2004/0114618 A1 | 6/2004 | Tong et al. |
| 2004/0120411 A1 | 6/2004 | Walton et al. |
| 2004/0125792 A1 | 7/2004 | Bradbury et al. |
| 2004/0128605 A1 | 7/2004 | Sibecas et al. |
| 2004/0131007 A1 | 7/2004 | Smee et al. |
| 2004/0131008 A1 | 7/2004 | Zuniga et al. |
| 2004/0131038 A1 | 7/2004 | Kim et al. |
| 2004/0131110 A1 | 7/2004 | Alard et al. |
| 2004/0136344 A1 | 7/2004 | Kim et al. |
| 2004/0136349 A1 | 7/2004 | Walton et al. |
| 2004/0156328 A1 | 8/2004 | Walton et al. |
| 2004/0160914 A1 | 8/2004 | Sarkar |
| 2004/0160933 A1 | 8/2004 | Odenwalder et al. |
| 2004/0162083 A1 | 8/2004 | Chen et al. |
| 2004/0165564 A1 | 8/2004 | Kim et al. |
| 2004/0166867 A1 | 8/2004 | Hawe et al. |
| 2004/0166887 A1 | 8/2004 | Laroia et al. |
| 2004/0170152 A1 | 9/2004 | Nagao et al. |
| 2004/0170157 A1 | 9/2004 | Kim et al. |
| 2004/0171384 A1 | 9/2004 | Holma et al. |
| 2004/0171385 A1 | 9/2004 | Haustein et al. |
| 2004/0178954 A1 | 9/2004 | Vook et al. |
| 2004/0179506 A1 | 9/2004 | Padovani et al. |
| 2004/0179627 A1 | 9/2004 | Ketchum et al. |
| 2004/0185792 A1 | 9/2004 | Alexiou et al. |
| 2004/0190640 A1 | 9/2004 | Dubuc et al. |
| 2004/0202257 A1 | 10/2004 | Mehta et al. |
| 2004/0208138 A1 | 10/2004 | Hayashi et al. |
| 2004/0218520 A1 | 11/2004 | Aizawa et al. |
| 2004/0219819 A1 | 11/2004 | Di Mascio et al. |
| 2004/0219919 A1 | 11/2004 | Whinnett et al. |
| 2004/0224711 A1 | 11/2004 | Panchal et al. |
| 2004/0228267 A1 | 11/2004 | Agrawal et al. |
| 2004/0228313 A1 | 11/2004 | Cheng et al. |
| 2004/0229615 A1 | 11/2004 | Agrawal et al. |
| 2004/0240419 A1 | 12/2004 | Abrishamkar et al. |
| 2004/0240572 A1 | 12/2004 | Brutel et al. |
| 2004/0248604 A1 | 12/2004 | Vaidyanathan et al. |
| 2004/0252529 A1 | 12/2004 | Huber et al. |
| 2004/0252629 A1 | 12/2004 | Hasegawa et al. |
| 2004/0252655 A1 | 12/2004 | Lim et al. |
| 2004/0252662 A1 | 12/2004 | Cho |
| 2004/0257979 A1 | 12/2004 | Ro et al. |
| 2004/0264507 A1 | 12/2004 | Cho et al. |
| 2004/0264585 A1 | 12/2004 | Borran et al. |
| 2005/0002412 A1 | 1/2005 | Sagfors et al. |
| 2005/0002440 A1 | 1/2005 | Alamouti et al. |
| 2005/0002467 A1 | 1/2005 | Seo et al. |
| 2005/0002468 A1 | 1/2005 | Walton et al. |
| 2005/0003782 A1 | 1/2005 | Wintzell |

(56) References Cited

U.S. PATENT DOCUMENTS

| | | |
|---|---|---|
| 2005/0008091 A1 | 1/2005 | Boutros et al. |
| 2005/0009486 A1 | 1/2005 | Al-Dhahir et al. |
| 2005/0013263 A1 | 1/2005 | Kim et al. |
| 2005/0025093 A1 | 2/2005 | Yun et al. |
| 2005/0030886 A1 | 2/2005 | Wu et al. |
| 2005/0030964 A1 | 2/2005 | Tiedemann Jr. et al. |
| 2005/0034079 A1 | 2/2005 | Gunasekar et al. |
| 2005/0041611 A1 | 2/2005 | Sandhu |
| 2005/0041618 A1 | 2/2005 | Wei et al. |
| 2005/0041750 A1 | 2/2005 | Lau et al. |
| 2005/0041775 A1 | 2/2005 | Batzinger et al. |
| 2005/0044206 A1 | 2/2005 | Johansson et al. |
| 2005/0047517 A1 | 3/2005 | Georgios et al. |
| 2005/0052991 A1 | 3/2005 | Kadous |
| 2005/0053081 A1 | 3/2005 | Andersson et al. |
| 2005/0053151 A1* | 3/2005 | Lin et al. .................. 375/240.18 |
| 2005/0063298 A1 | 3/2005 | Ling et al. |
| 2005/0073976 A1 | 4/2005 | Fujii |
| 2005/0084000 A1 | 4/2005 | Krauss et al. |
| 2005/0085195 A1 | 4/2005 | Tong et al. |
| 2005/0085236 A1 | 4/2005 | Gerlach et al. |
| 2005/0111397 A1 | 5/2005 | Attar et al. |
| 2005/0113100 A1 | 5/2005 | Oprescu-Surcobe et al. |
| 2005/0122898 A1 | 6/2005 | Jang et al. |
| 2005/0128683 A1 | 6/2005 | Watanabe et al. |
| 2005/0128983 A1 | 6/2005 | Kim et al. |
| 2005/0135324 A1 | 6/2005 | Kim et al. |
| 2005/0135498 A1 | 6/2005 | Yee |
| 2005/0141624 A1 | 6/2005 | Lakshmipathi et al. |
| 2005/0147024 A1 | 7/2005 | Jung et al. |
| 2005/0147025 A1 | 7/2005 | Auer et al. |
| 2005/0152484 A1 | 7/2005 | Sandhu et al. |
| 2005/0157807 A1 | 7/2005 | Shim et al. |
| 2005/0159162 A1 | 7/2005 | Park |
| 2005/0164709 A1 | 7/2005 | Balasubramanian et al. |
| 2005/0165949 A1 | 7/2005 | Teague |
| 2005/0174981 A1 | 8/2005 | Heath et al. |
| 2005/0175070 A1 | 8/2005 | Grob et al. |
| 2005/0180311 A1 | 8/2005 | Wang et al. |
| 2005/0180313 A1 | 8/2005 | Kim et al. |
| 2005/0181799 A1 | 8/2005 | Laroia et al. |
| 2005/0192011 A1 | 9/2005 | Hong et al. |
| 2005/0195733 A1 | 9/2005 | Walton et al. |
| 2005/0195852 A1 | 9/2005 | Vayanos et al. |
| 2005/0195886 A1 | 9/2005 | Lampinen et al. |
| 2005/0201296 A1 | 9/2005 | Vannithamby et al. |
| 2005/0207367 A1 | 9/2005 | Onggosanusi et al. |
| 2005/0215251 A1 | 9/2005 | Krishnan et al. |
| 2005/0226204 A1 | 10/2005 | Uehara et al. |
| 2005/0239465 A1 | 10/2005 | Lee et al. |
| 2005/0243791 A1 | 11/2005 | Park et al. |
| 2005/0246548 A1 | 11/2005 | Laitinen et al. |
| 2005/0249266 A1 | 11/2005 | Brown et al. |
| 2005/0254416 A1 | 11/2005 | Laroia et al. |
| 2005/0254467 A1 | 11/2005 | Li et al. |
| 2005/0254477 A1 | 11/2005 | Lee et al. |
| 2005/0254556 A1 | 11/2005 | Fujii et al. |
| 2005/0259005 A1 | 11/2005 | Chiang et al. |
| 2005/0259723 A1 | 11/2005 | Blanchard et al. |
| 2005/0259757 A1 | 11/2005 | Wu et al. |
| 2005/0265220 A1 | 12/2005 | Erlich et al. |
| 2005/0265293 A1 | 12/2005 | Ro et al. |
| 2005/0271012 A1 | 12/2005 | Agrawal et al. |
| 2005/0276347 A1 | 12/2005 | Mujtaba et al. |
| 2005/0276348 A1 | 12/2005 | Vandenameele |
| 2005/0277423 A1 | 12/2005 | Sandhu et al. |
| 2005/0281029 A1 | 12/2005 | Inamoto et al. |
| 2005/0281290 A1 | 12/2005 | Khandekar et al. |
| 2005/0282500 A1 | 12/2005 | Wang et al. |
| 2005/0286408 A1 | 12/2005 | Jin et al. |
| 2005/0289256 A1 | 12/2005 | Cudak et al. |
| 2006/0002451 A1 | 1/2006 | Fukuta et al. |
| 2006/0013285 A1 | 1/2006 | Kobayashi et al. |
| 2006/0018336 A1 | 1/2006 | Sutivong et al. |
| 2006/0018347 A1 | 1/2006 | Agrawal |
| 2006/0018397 A1 | 1/2006 | Sampath et al. |
| 2006/0026344 A1 | 2/2006 | Sun Hsu et al. |
| 2006/0029289 A1 | 2/2006 | Yamaguchi et al. |
| 2006/0034164 A1 | 2/2006 | Ozluturk et al. |
| 2006/0034173 A1 | 2/2006 | Teague et al. |
| 2006/0039332 A1 | 2/2006 | Kotzin |
| 2006/0039344 A1 | 2/2006 | Khan |
| 2006/0039500 A1 | 2/2006 | Yun et al. |
| 2006/0040655 A1 | 2/2006 | Kim et al. |
| 2006/0045003 A1 | 3/2006 | Choi et al. |
| 2006/0050770 A1 | 3/2006 | Wallace et al. |
| 2006/0056340 A1 | 3/2006 | Hottinen et al. |
| 2006/0057958 A1 | 3/2006 | Ngo et al. |
| 2006/0067421 A1 | 3/2006 | Walton et al. |
| 2006/0078075 A1 | 4/2006 | Stamoulis et al. |
| 2006/0083159 A1 | 4/2006 | Laroia et al. |
| 2006/0083183 A1 | 4/2006 | Teague et al. |
| 2006/0092054 A1 | 5/2006 | Li et al. |
| 2006/0093065 A1 | 5/2006 | Thomas et al. |
| 2006/0104333 A1 | 5/2006 | Rainbolt et al. |
| 2006/0104381 A1 | 5/2006 | Menon et al. |
| 2006/0109814 A1 | 5/2006 | Kuzminskiy et al. |
| 2006/0111054 A1 | 5/2006 | Pan et al. |
| 2006/0114858 A1 | 6/2006 | Walton et al. |
| 2006/0120469 A1 | 6/2006 | Maltsev et al. |
| 2006/0120471 A1 | 6/2006 | Learned et al. |
| 2006/0126491 A1 | 6/2006 | Ro et al. |
| 2006/0133269 A1 | 6/2006 | Prakash et al. |
| 2006/0133455 A1 | 6/2006 | Agrawal et al. |
| 2006/0133521 A1 | 6/2006 | Sampath et al. |
| 2006/0140289 A1 | 6/2006 | Mandyam et al. |
| 2006/0153239 A1 | 7/2006 | Julian et al. |
| 2006/0155534 A1 | 7/2006 | Lin et al. |
| 2006/0156199 A1 | 7/2006 | Palanki et al. |
| 2006/0172704 A1 | 8/2006 | Nishio et al. |
| 2006/0189321 A1 | 8/2006 | Oh et al. |
| 2006/0193294 A1 | 8/2006 | Jorswieck et al. |
| 2006/0203708 A1 | 9/2006 | Sampath et al. |
| 2006/0203794 A1 | 9/2006 | Sampath et al. |
| 2006/0203891 A1 | 9/2006 | Sampath et al. |
| 2006/0203932 A1 | 9/2006 | Palanki et al. |
| 2006/0209670 A1 | 9/2006 | Gorokhov et al. |
| 2006/0209732 A1 | 9/2006 | Gorokhov et al. |
| 2006/0209754 A1 | 9/2006 | Ji et al. |
| 2006/0209764 A1 | 9/2006 | Kim et al. |
| 2006/0209973 A1 | 9/2006 | Gorokhov et al. |
| 2006/0215777 A1 | 9/2006 | Krishnamoorthi |
| 2006/0218459 A1 | 9/2006 | Hedberg |
| 2006/0223449 A1 | 10/2006 | Sampath et al. |
| 2006/0233124 A1 | 10/2006 | Palanki |
| 2006/0233131 A1 | 10/2006 | Gore et al. |
| 2006/0262754 A1 | 11/2006 | Andersson et al. |
| 2006/0270427 A1 | 11/2006 | Shida et al. |
| 2006/0274836 A1 | 12/2006 | Sampath et al. |
| 2006/0285485 A1 | 12/2006 | Agrawal et al. |
| 2006/0285515 A1 | 12/2006 | Julian et al. |
| 2006/0286974 A1 | 12/2006 | Gore et al. |
| 2006/0286982 A1 | 12/2006 | Prakash et al. |
| 2006/0286995 A1 | 12/2006 | Onggosanusi et al. |
| 2006/0291371 A1 | 12/2006 | Sutivong et al. |
| 2006/0292989 A1 | 12/2006 | Gerlach et al. |
| 2007/0004430 A1 | 1/2007 | Hyun et al. |
| 2007/0005749 A1 | 1/2007 | Sampath |
| 2007/0009011 A1 | 1/2007 | Coulsonn et al. |
| 2007/0019596 A1 | 1/2007 | Barriac et al. |
| 2007/0025345 A1 | 2/2007 | Bachl et al. |
| 2007/0041311 A1 | 2/2007 | Baum et al. |
| 2007/0041404 A1 | 2/2007 | Palanki et al. |
| 2007/0041457 A1 | 2/2007 | Kadous et al. |
| 2007/0047495 A1 | 3/2007 | Ji et al. |
| 2007/0049218 A1 | 3/2007 | Gorokhov et al. |
| 2007/0053282 A1 | 3/2007 | Tong et al. |
| 2007/0053383 A1 | 3/2007 | Choi et al. |
| 2007/0060178 A1 | 3/2007 | Gorokhov et al. |
| 2007/0064669 A1 | 3/2007 | Classon et al. |
| 2007/0071147 A1 | 3/2007 | Sampath et al. |
| 2007/0097853 A1 | 5/2007 | Khandekar et al. |
| 2007/0097889 A1 | 5/2007 | Wang et al. |
| 2007/0097897 A1 | 5/2007 | Teague et al. |

(56) References Cited

U.S. PATENT DOCUMENTS

| | | | |
|---|---|---|---|
| 2007/0097908 A1 | 5/2007 | Khandekar et al. |
| 2007/0097909 A1 | 5/2007 | Khandekar et al. |
| 2007/0097910 A1 | 5/2007 | Ji et al. |
| 2007/0097922 A1 | 5/2007 | Parekh et al. |
| 2007/0097927 A1 | 5/2007 | Gorokhov et al. |
| 2007/0097942 A1 | 5/2007 | Gorokhov et al. |
| 2007/0097981 A1 | 5/2007 | Papasakellariou et al. |
| 2007/0098050 A1 | 5/2007 | Khandekar et al. |
| 2007/0098120 A1 | 5/2007 | Wang |
| 2007/0099666 A1 | 5/2007 | Astely et al. |
| 2007/0110172 A1 | 5/2007 | Faulkner et al. |
| 2007/0115795 A1 | 5/2007 | Gore et al. |
| 2007/0149194 A1 | 6/2007 | Das et al. |
| 2007/0149228 A1 | 6/2007 | Das |
| 2007/0159969 A1 | 7/2007 | Das et al. |
| 2007/0160115 A1 | 7/2007 | Palanki et al. |
| 2007/0165738 A1 | 7/2007 | Barriac et al. |
| 2007/0177631 A1 | 8/2007 | Popovic et al. |
| 2007/0177681 A1 | 8/2007 | Choi et al. |
| 2007/0183303 A1 | 8/2007 | Pi et al. |
| 2007/0207812 A1 | 9/2007 | Borran et al. |
| 2007/0211616 A1 | 9/2007 | Khandekar et al. |
| 2007/0211667 A1 | 9/2007 | Agrawal et al. |
| 2007/0230324 A1 | 10/2007 | Li et al. |
| 2007/0242653 A1 | 10/2007 | Yang et al. |
| 2007/0263743 A1 | 11/2007 | Lee et al. |
| 2007/0280336 A1 | 12/2007 | Zhangg et al. |
| 2007/0281702 A1 | 12/2007 | Lim et al. |
| 2008/0039129 A1 | 2/2008 | Li et al. |
| 2008/0063099 A1 | 3/2008 | Laroia et al. |
| 2008/0095223 A1 | 4/2008 | Tong et al. |
| 2008/0095262 A1 | 4/2008 | Hoo et al. |
| 2008/0151829 A1 | 6/2008 | Khandekar et al. |
| 2008/0181139 A1 | 7/2008 | Rangarajan et al. |
| 2008/0214222 A1 | 9/2008 | Atarashi et al. |
| 2008/0253279 A1 | 10/2008 | Ma et al. |
| 2008/0299983 A1 | 12/2008 | Kwak et al. |
| 2009/0003466 A1 | 1/2009 | Taherzadehboroujeni et al. |
| 2009/0010351 A1 | 1/2009 | Laroia et al. |
| 2009/0022098 A1 | 1/2009 | Novak et al. |
| 2009/0041150 A1 | 2/2009 | Tsai et al. |
| 2009/0110103 A1 | 4/2009 | Maltsev et al. |
| 2009/0197646 A1 | 8/2009 | Tamura et al. |
| 2009/0201826 A1 | 8/2009 | Gorokhov et al. |
| 2009/0201872 A1 | 8/2009 | Gorokhov et al. |
| 2009/0213750 A1 | 8/2009 | Gorokhov et al. |
| 2009/0213950 A1 | 8/2009 | Gorokhov et al. |
| 2009/0262641 A1 | 10/2009 | Laroia et al. |
| 2009/0285163 A1 | 11/2009 | Zhang et al. |
| 2009/0287977 A1 | 11/2009 | Chang et al. |
| 2010/0135242 A1 | 6/2010 | Nam et al. |
| 2010/0220800 A1 | 9/2010 | Erell et al. |
| 2010/0232384 A1 | 9/2010 | Farajidana et al. |
| 2010/0238902 A1 | 9/2010 | Ji et al. |
| 2010/0254263 A1 | 10/2010 | Chen et al. |
| 2011/0064070 A1 | 3/2011 | Gore et al. |
| 2011/0235733 A1 | 9/2011 | Laroia et al. |
| 2011/0235745 A1 | 9/2011 | Laroia et al. |
| 2011/0235746 A1 | 9/2011 | Laroia et al. |
| 2011/0235747 A1 | 9/2011 | Laroia et al. |
| 2011/0255518 A9 | 10/2011 | Agrawal et al. |
| 2011/0306291 A1 | 12/2011 | Ma et al. |
| 2012/0002623 A1 | 1/2012 | Khandekar et al. |
| 2012/0063441 A1 | 3/2012 | Palanki |
| 2012/0120925 A1 | 5/2012 | Kadous et al. |
| 2012/0140798 A1 | 6/2012 | Kadous et al. |
| 2012/0140838 A1 | 6/2012 | Kadous et al. |
| 2013/0016678 A1 | 1/2013 | Laroia et al. |

FOREIGN PATENT DOCUMENTS

| | | |
|---|---|---|
| CA | 2540688 | 5/2005 |
| CA | 2577369 | 3/2006 |
| CL | 14001993 | 12/1994 |
| CL | 8461997 | 1/1998 |
| CL | 9531997 | 1/1998 |
| CL | 27102004 | 8/2005 |
| CL | 22892004 | 9/2005 |
| CL | 30862004 | 10/2005 |
| CL | 29932005 | 5/2006 |
| CL | 1520-2006 | 6/2006 |
| CL | 2907-2006 | 10/2006 |
| CL | 29012006 | 10/2006 |
| CL | 29022006 | 10/2006 |
| CL | 29032006 | 10/2006 |
| CL | 29042006 | 10/2006 |
| CL | 29062006 | 10/2006 |
| CL | 29082006 | 10/2006 |
| CL | 22032006 | 2/2007 |
| CL | 15212006 | 3/2007 |
| CL | 14922006 | 4/2007 |
| CL | 14892006 | 5/2007 |
| CL | 14902006 | 5/2007 |
| CL | 33882005 | 6/2007 |
| CN | 1252919 | 5/2000 |
| CN | 1267437 | 9/2000 |
| CN | 1284795 | 2/2001 |
| CN | 1296682 | 5/2001 |
| CN | 1344451 | 4/2002 |
| CN | 1346221 | 4/2002 |
| CN | 1383631 | 12/2002 |
| CN | 1386344 | 12/2002 |
| CN | 1402916 A | 3/2003 |
| CN | 1424835 | 6/2003 |
| CN | 1132474 C | 12/2003 |
| CN | 1467938 A | 1/2004 |
| CN | 1487755 A | 4/2004 |
| CN | 1520220 | 8/2004 |
| CN | 1525678 | 9/2004 |
| CN | 1636346 | 7/2005 |
| CN | 1642051 A | 7/2005 |
| CN | 1647436 | 7/2005 |
| DE | 19800653 A1 | 7/1999 |
| DE | 19800953 | 7/1999 |
| DE | 19957288 | 5/2001 |
| DE | 10240138 | 8/2003 |
| DE | 10254384 | 6/2004 |
| EP | 0488976 | 6/1992 |
| EP | 0568291 A2 | 11/1993 |
| EP | 0805576 A2 | 1/1997 |
| EP | 0786889 | 7/1997 |
| EP | 0807989 | 11/1997 |
| EP | 0844796 | 5/1998 |
| EP | 0981222 | 2/2000 |
| EP | 1001570 A2 | 5/2000 |
| EP | 1047209 A1 | 10/2000 |
| EP | 1 061 687 A | 12/2000 |
| EP | 1093241 | 1/2001 |
| EP | 1091516 | 4/2001 |
| EP | 1148673 | 10/2001 |
| EP | 1180907 A2 | 2/2002 |
| EP | 1187506 | 3/2002 |
| EP | 1204217 | 5/2002 |
| EP | 1255369 | 11/2002 |
| EP | 1267513 | 12/2002 |
| EP | 1 286 490 A2 | 2/2003 |
| EP | 1335504 | 8/2003 |
| EP | 1376920 | 1/2004 |
| EP | 1392073 A1 | 2/2004 |
| EP | 1434365 A2 | 6/2004 |
| EP | 1441469 A2 | 7/2004 |
| EP | 1445873 | 8/2004 |
| EP | 1465449 A1 | 10/2004 |
| EP | 1478204 A2 | 11/2004 |
| EP | 1507421 | 2/2005 |
| EP | 1513356 | 3/2005 |
| EP | 1513356 A2 | 3/2005 |
| EP | 1531575 A2 | 5/2005 |
| EP | 1533950 | 5/2005 |
| EP | 1538863 | 6/2005 |
| EP | 1542488 | 6/2005 |
| EP | 1601149 | 11/2005 |
| EP | 1643669 | 4/2006 |

(56) References Cited

FOREIGN PATENT DOCUMENTS

| | | |
|---|---|---|
| EP | 1898542 A1 | 3/2008 |
| EP | 1941693 | 7/2011 |
| FR | 2584884 | 1/1987 |
| GB | 2279540 | 1/1995 |
| GB | 2279540 A | 1/1995 |
| GB | 2348776 | 10/2000 |
| GB | 2412541 | 9/2005 |
| IL | 167573 | 2/2011 |
| IL | 201872 | 5/2012 |
| JP | 4301931 A | 10/1992 |
| JP | 7336323 A | 12/1995 |
| JP | 8116329 A | 5/1996 |
| JP | 08288927 | 11/1996 |
| JP | 9008725 A | 1/1997 |
| JP | H09501548 A | 2/1997 |
| JP | 9131342 | 5/1997 |
| JP | 9182148 A | 7/1997 |
| JP | 09214404 | 8/1997 |
| JP | 9284200 A | 10/1997 |
| JP | 10117162 | 5/1998 |
| JP | 10322304 | 12/1998 |
| JP | 11191756 A | 7/1999 |
| JP | 11196109 | 7/1999 |
| JP | 11508417 T | 7/1999 |
| JP | 11239155 A | 8/1999 |
| JP | 11298954 | 10/1999 |
| JP | 11331927 A | 11/1999 |
| JP | 2000102065 A | 4/2000 |
| JP | 2000184425 | 6/2000 |
| JP | 2000511750 A | 9/2000 |
| JP | 2000-332724 | 11/2000 |
| JP | 2001016644 A2 | 1/2001 |
| JP | 2001045573 A | 2/2001 |
| JP | 2001057545 A | 2/2001 |
| JP | 2001156732 A | 6/2001 |
| JP | 2001238269 | 8/2001 |
| JP | 2001245355 A | 9/2001 |
| JP | 2001249802 | 9/2001 |
| JP | 2001521698 A | 11/2001 |
| JP | 2001526012 | 12/2001 |
| JP | 2002026790 | 1/2002 |
| JP | 2002515203 T | 5/2002 |
| JP | 2002534925 A | 10/2002 |
| JP | 2002534941 | 10/2002 |
| JP | 2003032218 | 1/2003 |
| JP | 2003500909 | 1/2003 |
| JP | 200369472 | 3/2003 |
| JP | 2003101515 | 4/2003 |
| JP | 2003169367 A | 6/2003 |
| JP | 2003174426 | 6/2003 |
| JP | 2003199173 A | 7/2003 |
| JP | 2003520523 | 7/2003 |
| JP | 2003249907 A | 9/2003 |
| JP | 2003292667 A | 10/2003 |
| JP | 2003347985 | 12/2003 |
| JP | 2003348047 | 12/2003 |
| JP | 2004007643 A | 1/2004 |
| JP | 2004023716 | 1/2004 |
| JP | 2004048716 | 2/2004 |
| JP | 200472457 | 3/2004 |
| JP | 2004072157 A | 3/2004 |
| JP | 2004096142 | 3/2004 |
| JP | 2004507950 A | 3/2004 |
| JP | 2004153676 | 5/2004 |
| JP | 2004158901 A | 6/2004 |
| JP | 2004162388 A | 6/2004 |
| JP | 2004194262 A | 7/2004 |
| JP | 2004221972 | 8/2004 |
| JP | 2004266818 | 9/2004 |
| JP | 2004529524 T | 9/2004 |
| JP | 2004297276 | 10/2004 |
| JP | 2004297756 | 10/2004 |
| JP | 2004534456 | 11/2004 |
| JP | 2004535106 A | 11/2004 |
| JP | 2005-020530 | 1/2005 |
| JP | 2005006337 | 1/2005 |
| JP | 2005502218 T | 1/2005 |
| JP | 2005506757 | 3/2005 |
| JP | 2005130491 A | 5/2005 |
| JP | 2005197772 | 7/2005 |
| JP | 2005203961 | 7/2005 |
| JP | 2005521327 | 7/2005 |
| JP | 2005521358 | 7/2005 |
| JP | 2006505172 | 2/2006 |
| JP | 2006506860 A | 2/2006 |
| JP | 2006211537 A | 8/2006 |
| JP | 2007503790 | 2/2007 |
| JP | 2007519281 | 7/2007 |
| JP | 2007520309 A | 7/2007 |
| JP | 2007525043 T | 8/2007 |
| JP | 2007527127 | 9/2007 |
| JP | 2008505587 A | 2/2008 |
| JP | 2008535398 | 8/2008 |
| JP | 4188372 B2 | 11/2008 |
| JP | 2008546314 | 12/2008 |
| JP | 04694628 B2 | 6/2011 |
| KR | 0150275 B1 | 11/1998 |
| KR | 20000060428 | 10/2000 |
| KR | 100291476 B1 | 3/2001 |
| KR | 20010056333 | 4/2001 |
| KR | 20010087715 A | 9/2001 |
| KR | 20030007965 | 1/2003 |
| KR | 20030035969 A | 5/2003 |
| KR | 20040063057 | 7/2004 |
| KR | 200471652 | 8/2004 |
| KR | 2004-0103441 | 12/2004 |
| KR | 20040103441 | 12/2004 |
| KR | 20050061559 | 6/2005 |
| KR | 20050063826 A | 6/2005 |
| KR | 100606099 | 7/2006 |
| RU | 2005106258 | 0/2008 |
| RU | 95121152 | 12/1997 |
| RU | 2141168 | 11/1999 |
| RU | 2141706 | 11/1999 |
| RU | 2159007 C2 | 11/2000 |
| RU | 2162275 C2 | 1/2001 |
| RU | 2192094 C1 | 10/2002 |
| RU | 2197778 C2 | 1/2003 |
| RU | 2207723 | 6/2003 |
| RU | 2207723 C1 | 6/2003 |
| RU | 2208913 | 7/2003 |
| RU | 2210866 C2 | 8/2003 |
| RU | 2216101 C2 | 11/2003 |
| RU | 2216105 | 11/2003 |
| RU | 2225080 C2 | 2/2004 |
| RU | 2235429 | 8/2004 |
| RU | 2235432 C2 | 8/2004 |
| RU | 2237379 | 9/2004 |
| RU | 2238611 C1 | 10/2004 |
| RU | 2242091 C2 | 12/2004 |
| RU | 2003125268 | 2/2005 |
| RU | 2285388 | 3/2005 |
| RU | 2250564 | 4/2005 |
| RU | 2257008 | 7/2005 |
| RU | 2267224 | 12/2005 |
| RU | 2005129079 A | 2/2006 |
| RU | 2285338 C2 | 10/2006 |
| RU | 2285351 C2 | 10/2006 |
| RU | 2292655 | 1/2007 |
| RU | 2349043 C2 | 3/2009 |
| SU | 1320883 | 6/1987 |
| TW | 508960 | 11/2002 |
| TW | 510132 | 11/2002 |
| TW | 200302642 | 8/2003 |
| TW | 200401572 | 1/2004 |
| TW | 1232040 | 5/2005 |
| TW | 1248266 | 1/2006 |
| TW | 200718128 | 5/2007 |
| WO | WO9408432 | 4/1994 |
| WO | 9521494 | 8/1995 |
| WO | WO-9613920 A1 | 5/1996 |
| WO | WO9701256 | 1/1997 |
| WO | WO9737456 A2 | 10/1997 |
| WO | WO-9746033 A2 | 12/1997 |

(56) References Cited

FOREIGN PATENT DOCUMENTS

| | | |
|---|---|---|
| WO | 9800946 | 1/1998 |
| WO | WO-9814026 A1 | 4/1998 |
| WO | WO9837706 A2 | 8/1998 |
| WO | WO9848581 A1 | 10/1998 |
| WO | WO9853561 | 11/1998 |
| WO | WO9854919 A2 | 12/1998 |
| WO | 9941871 | 8/1999 |
| WO | WO-9944313 A1 | 9/1999 |
| WO | WO-9944383 A1 | 9/1999 |
| WO | 9952250 | 10/1999 |
| WO | WO9953713 | 10/1999 |
| WO | 99060729 | 11/1999 |
| WO | WO-9959265 A1 | 11/1999 |
| WO | WO9960729 A1 | 11/1999 |
| WO | WO0002397 | 1/2000 |
| WO | WO0033503 | 6/2000 |
| WO | WO0070897 | 11/2000 |
| WO | WO01001596 | 1/2001 |
| WO | WO0117125 A1 | 3/2001 |
| WO | WO0126269 | 4/2001 |
| WO | WO-0139523 A2 | 5/2001 |
| WO | WO01045300 | 6/2001 |
| WO | 0148969 | 7/2001 |
| WO | 0158054 | 8/2001 |
| WO | WO-0160106 A1 | 8/2001 |
| WO | WO0169814 A1 | 9/2001 |
| WO | 0182544 | 11/2001 |
| WO | 0189112 | 11/2001 |
| WO | WO0182543 | 11/2001 |
| WO | WO0193505 | 12/2001 |
| WO | 0204936 | 1/2002 |
| WO | WO0207375 | 1/2002 |
| WO | WO0215616 | 2/2002 |
| WO | 0219746 | 3/2002 |
| WO | 0231991 | 4/2002 |
| WO | 0233848 | 4/2002 |
| WO | 0249306 | 6/2002 |
| WO | WO0245456 A1 | 6/2002 |
| WO | WO0249385 A2 | 6/2002 |
| WO | WO02049305 | 6/2002 |
| WO | WO02060138 | 8/2002 |
| WO | WO02065675 | 8/2002 |
| WO | 02082743 | 10/2002 |
| WO | WO02082689 A2 | 10/2002 |
| WO | WO02089434 A1 | 11/2002 |
| WO | WO02093782 A1 | 11/2002 |
| WO | WO02093819 A1 | 11/2002 |
| WO | WO02100027 A1 | 12/2002 |
| WO | 03001696 | 1/2003 |
| WO | 03001981 | 1/2003 |
| WO | WO03001696 A2 | 1/2003 |
| WO | WO03001761 A1 | 1/2003 |
| WO | WO-03003617 A2 | 1/2003 |
| WO | WO03019819 | 3/2003 |
| WO | WO03030414 | 4/2003 |
| WO | WO03034644 A1 | 4/2003 |
| WO | WO03043262 | 5/2003 |
| WO | WO03043369 | 5/2003 |
| WO | 03058871 | 7/2003 |
| WO | WO03058871 A1 | 7/2003 |
| WO | WO03067783 | 8/2003 |
| WO | WO03069832 | 8/2003 |
| WO | WO03073646 | 9/2003 |
| WO | WO03075479 | 9/2003 |
| WO | WO03085876 | 10/2003 |
| WO | WO03088538 A1 | 10/2003 |
| WO | WO03094384 | 11/2003 |
| WO | WO03103331 | 12/2003 |
| WO | WO2004002047 A1 | 12/2003 |
| WO | 2004008681 | 1/2004 |
| WO | WO04004370 | 1/2004 |
| WO | WO2004008671 | 1/2004 |
| WO | WO2004015912 | 2/2004 |
| WO | WO2004016007 | 2/2004 |
| WO | WO2004021605 A1 | 3/2004 |
| WO | WO2004023834 A1 | 3/2004 |
| WO | 2004030238 | 4/2004 |
| WO | 2004032443 | 4/2004 |
| WO | 2004038972 | 5/2004 |
| WO | 2004040690 | 5/2004 |
| WO | 2004040827 | 5/2004 |
| WO | WO2004038954 | 5/2004 |
| WO | WO-2004038988 A2 | 5/2004 |
| WO | 2004051872 | 6/2004 |
| WO | WO2004047354 | 6/2004 |
| WO | WO2004049618 A1 | 6/2004 |
| WO | WO2004062255 | 7/2004 |
| WO | WO2004064294 | 7/2004 |
| WO | WO2004064295 | 7/2004 |
| WO | 2004073276 | 8/2004 |
| WO | WO2004066520 | 8/2004 |
| WO | WO2004068721 A2 | 8/2004 |
| WO | WO2004075023 | 9/2004 |
| WO | WO2004075442 | 9/2004 |
| WO | WO2004075448 | 9/2004 |
| WO | WO 2004075468 | 9/2004 |
| WO | WO2004075596 | 9/2004 |
| WO | WO2004077850 A2 | 9/2004 |
| WO | WO2004084509 | 9/2004 |
| WO | 2004/086711 A | 10/2004 |
| WO | WO-2004086706 A1 | 10/2004 |
| WO | 2004095851 | 11/2004 |
| WO | 2004098072 | 11/2004 |
| WO | WO2004095730 A1 | 11/2004 |
| WO | WO2004095854 | 11/2004 |
| WO | WO2004098222 | 11/2004 |
| WO | WO2004102815 | 11/2004 |
| WO | WO2004102816 A2 | 11/2004 |
| WO | 2004114564 A1 | 12/2004 |
| WO | WO2004105272 A1 | 12/2004 |
| WO | WO2004114549 | 12/2004 |
| WO | 2005002253 | 1/2005 |
| WO | WO2005002253 A1 | 1/2005 |
| WO | 2005011163 A1 | 2/2005 |
| WO | 2005015797 | 2/2005 |
| WO | 2005015941 | 2/2005 |
| WO | 2005018270 | 2/2005 |
| WO | WO-2005015795 A1 | 2/2005 |
| WO | WO2005015810 | 2/2005 |
| WO | WO2005020488 A1 | 3/2005 |
| WO | WO2005020490 | 3/2005 |
| WO | WO2005022811 A2 | 3/2005 |
| WO | WO2005025110 A2 | 3/2005 |
| WO | 2005032004 A1 | 4/2005 |
| WO | WO2005043855 | 5/2005 |
| WO | WO2005046080 | 5/2005 |
| WO | 2005055527 | 6/2005 |
| WO | WO2005055484 A1 | 6/2005 |
| WO | WO2005060192 A1 | 6/2005 |
| WO | 2005065062 | 7/2005 |
| WO | WO-2005069538 A1 | 7/2005 |
| WO | WO2005074184 | 8/2005 |
| WO | 2005096538 | 10/2005 |
| WO | WO2005122628 | 12/2005 |
| WO | 2006007292 A2 | 1/2006 |
| WO | WO2006019710 | 2/2006 |
| WO | 2006026344 | 3/2006 |
| WO | WO2006044487 | 4/2006 |
| WO | 2006069301 | 6/2006 |
| WO | WO2006069300 | 6/2006 |
| WO | WO2006069397 | 6/2006 |
| WO | WO2006077696 | 7/2006 |
| WO | 2006099349 | 9/2006 |
| WO | 2006099545 | 9/2006 |
| WO | 2006099577 | 9/2006 |
| WO | WO-2006096784 A1 | 9/2006 |
| WO | 2006127544 | 11/2006 |
| WO | 2006134032 | 12/2006 |
| WO | 2006138196 | 12/2006 |
| WO | 2006138573 | 12/2006 |
| WO | WO2006138581 A2 | 12/2006 |
| WO | 2007024935 | 3/2007 |
| WO | WO2007024934 A2 | 3/2007 |
| WO | WO-2007051159 A2 | 5/2007 |

(56) References Cited

FOREIGN PATENT DOCUMENTS

OTHER PUBLICATIONS

Favre et al., "Self-Adaptive Transmission Procedure," IBM Technical Disclosure Bulletin, IBM Corporation, Sep. 1976, vol. 19, No. 4, pp. 1283-1284, New York, New York.
Digital cellular telecommunications system (Phase 2+); Mobile radio interface layer 3 specification (GSM 04.08 version 7.7.1 Release 1998); ETSI EN 300 940 V7.7.7 (Oct. 2000), pp. 1,2,91-93.
Lau, et al., "On the Design of MIMO Block-Fading Channels with Feedback-Link Capacity Constraint," IEEE Transactions on Communications, IEEE Service Center, Piscataway, NJ, US. v. 52, No. 1 Jan. 2004, pp. 62-70, XP001189908.
Tomcik, J,: "MBFDD and MBTDD Wideband Mode: Technology Overview," IEEE 802.20 Working Group Mobile Broadband Wireless Access, Jan. 2006, pp. 1-109, XP002429968.
Toufik I et al., "Channel allocation algorithms for multi-carrier systems", Vehicular Technology Conference, 2004. VTC2004-Fall. 2004 IEEE 60th Los Angeles, CA, USA Sep. 26-29, 2004, pp. 1129-1133, XP010786798, ISBN: 07-7803-8521-7.
TIA-1121.001 "Physical Layer for Ultra Mobile Broadband (UMB) Air Interface Specification," 3GPP2 C.S0084-001-0, Version 2.0 (Aug. 2007).
TIA-1121.002 "Medium Access Control Layer for Ultra Mobile Broadband (UMB) Air Interface Specification," 3GPP2 C.S0084-002-0, Version 2.0 (Aug. 2007).
International Preliminary Report on Patentability—PCT/US06/033269—The International Bureau of WIPO, Geneva, Switzerland—Feb. 26, 2008.
Written Opinion—PCT/US06/033269, International Search Authority—European Patent Office Feb. 22, 2007.
Das,Arnab, et al. "Adaptive asynchronous incremental redundancy (A-IR) with fixed transmission time intervals TTI for HSDPA." IEEE, pp. 10-83-1087.
Andreas F. Molisch, Moe Z. Win: "MIMO systems with antenna selection" IEEE Microwave Magazine, (Online) Mar. 2004, pp. 46-56, XP002411128.
International Search Report—PCT/US06/033269, International Search Authority—European Patent Office—Feb. 22, 2007.
Jim Tomcik, QUALCOMM Incorporated: "QFDD Technology Overview Presentation" IEEE 802.20 Working Group on Mobile Broadband Wireless Access, Oct. 28, 2005.
John B. Groe, Lawrence E. Larson: "CDMA Mobile Radio Design" Sep. 26, 2001, Artech House, Norwood, MA02062 580530, XP002397967, pp. 157-159.
Junyi Li et al: "An integrated approach based on cross-layer optimization—Designing a mobile broadband wireless access network" IEEE Signal Processing Magazine, IEEE Service Center, Piscataway, NJ, US, vol. 21, No. 5, Sep. 2004, pp. 20-28, XP011118149.
3GPP TS 33.220 V.1.1.0 XX,XX, "3rd Generation Partnership Projects; Technical Specification Group Services and System Aspects; Generic Authentication Architecture (GAA); Generic Bootstrapping Architecture (Release 6)" Feb. 9, 2004, pp. 1-17, figure 4, XP002996023.
John B. Groe, Lawrence E. Larson, "CDMA Mobile Radio Design" Sep. 26, 2001, Artech House, Norwood, MA02062 580530, XP002397967, pp. 157-159.
Net Working Group, T. Dierks, C. Allen, Certicom; The TLS Protocol Version 1.0; Jan. 1999.
TIA/EIA/IS-2000 "Standards for CDMA2000 Spread Spectrum Systems" Version 1.0 Jul. 1999.
TIA/EIA/IS-95 "Mobile Station-Base Station Compatibility Standard for Dual-Mode Wideband Spread Spectrum Cellular System" Jul. 1993.
Wang, et al , "Improving performance of multi-user OFDM systems using bit-wise interleaver" Electronics Letters, IEE Stevenage, GB, vol. 37, No. 19, Sep. 13, 2001, pp. 1173-1174, XP006017222.
Yun, et al., "Performance of an LDPC-Coded Frequency-Hopping OFDMA System Based on Resource Allocation in the Uplink" Vehicular Technology Conference, 2004 VTC 2004-Spring, 2004 IEEE 59th Milan, Italy, May 17-19, 2004, Piscataway, NJ, USA, Vol. 4, May 2004, pp. 1925-1928, XP010766497.
Wang, et al., "Improving performance of multi-user OFDM systems using bit-wise interleaver" Electronics Letters IEE Stevenage, GB, vol. 37. No. 19, Sep. 13, 2001, pp. 1173-1174 XP006017222.
Yun et al "Performance Of an LDPC-Coded Frequency-Hopping QFCMA System Based on Resource Allocation in the Uplink" Vehicular Technology-Conference 2004. VTO 2004-Spring, 2004 IEEE 59th Milan, Italy May 17-19, 2004, Piscataway, NJ, USA, vol. 4, May 17, 2004. pp. 1925-1928. XP010766497.
B. Sklar: "The process of thus correcting the channel-induced distortion is called equalization", Digital Communications, PTR Prentice Hall, Upper Saddle River, New Jersey, 1998, Formatting and Baseband Transmission, Chap. 2, Section 2.11.2, pp. 104-106.
Blum, R. et al: "On Optimum MIMO with Antenna Selection," IEEE International Conference on Communications: Conference Proceedings, vol. 1, Apr. 28, 2002, pp. 386-390.
Catreux, S. et al.: "Simulation results for an interference-limited multiple input multiple output cellular system," Global Telecommunications Conference, 2000. GLOBECOM '00. IEEE. Dec. 1, 2000. vol. 2, pp. 1094-1096, http://ieeexplore.ieee.org/iel5/7153/19260/00891306.pdf?tp=&isnumber=19260&arnumber=8913063&punumber=7153.
Chung, S. et al.: "Low complexity algorithm for rate and power quantization in extended V-Blast" VTC Fall 2001. IEEE 54th. Vehicular Technology Conference Proceedings. Atlantic City, NJ, Oct. 7-11, 2001, vol. 1 of 4, pp. 910-914, Conf. 54.
El Gamal, H. et al.: "Universal Space-Time Coding," IEEE Transactions on Information Theory, vol. 49, Issue 5, pp. 1097-1119, XP011074756, ISSN: 0018-9448, May 2003.
"European Search Report—EP10011743, Search Authority—Munich Patent Office, Dec. 20, 2010 (060527EPD1D1)".
European Search Report—EP10012081, Search Authority—Munich Patent Office, Dec. 17, 2010 (060527EPD2).
European Search Report—EP10012082, Search Authority—Munich Patent Office, Dec. 20, 2010 (060527EPD3).
European Search Report—EP10012083, Search Authority—Munich Patent Office, Dec. 30, 2010 (060527EPD4).
Groe, J., et al., "CDMA Mobile Radio Design," Sep. 26, 2001, Artech House, Inc. Norwood, MA, pp. 257-259.
Guo, K. et al.: "Providing end-to-end QoS for multimedia applications in 3G wireless networks," Proceedings vol. 5242, SPIE ITCom 2003 Conf. Internet Multimedia Management Systems IV, Nov. 26, 2003, pp. 1-14, DOI: 10.1117/12.514061.
Hochwald, B. et al., "Achieving near-capacity on a multiple-antenna channel," IEEE Transactions on Communications, IEEE Service Center, Piscataway, New Jersey, vol. 51, No. 3, pp. 389-399 (2003).
Kiessling, M. et al., "Short-term and long-term diagonalization of correlated MIMO channels with adaptive modulation" IEEE International Symposium on Personal, Indoor and Mobile Radio Communications, vol. 2, Sep. 15, 2002, pp. 593-597.
Kousa, M. et al: "Adaptive Binary Coding for Diversity Communication Systems" IEEE International Conference on Personal Wireless Communications Proceedings, pp. 80-84, XP000992269, (1997).
Maniatis, I. et al., "Pilots for joint channel estimation in multi-user OFDM mobile radio systems," 2002 IEEE Seventh International Symposium on Spread Spectrum Techniques and Applications, Prague, Czech Republic, Sep. 2, 2002, pp. 44-48, XP010615562.
Nokia, "Uplink Considerations for UTRA LTE", 3GPP TSG RANH WG1#40bis, Beijing, CN, R1-050251, 3GPP, Apr. 4, 2005, pp. 1-9.
NTT DoCoMo, "Downlink Multiple Access Scheme for Evolved UTRA", 3GPP R1-050249, 3GPP, Apr. 4, 2005, pp. 1-8.
Prasad, N. et al.: "Analysis of Decision Feedback Detection for MIMO Rayleigh Fading Channels and Optimum Allocation of Transmitter Powers and QAM Constellations," pp. 1-10, 39th Annual Conference on Comm. Control and Comput., Monticello, IL Oct. 2001.
Qualcomm Europe: "Description and link simulations for OFDMA based E-UTRA uplink" 3GPP Draft; R1-051100, 3RD Generation Partnership Project (3GPP), Mobile Competence Centre; Sophia-

(56) References Cited

OTHER PUBLICATIONS

Antipolis Cedex, France, vol. RAN WG1, no. San Diego, USA; 20051004, Oct. 4, 2005, pp. 1-10, XP050100715.
Sumii, Kenji, et al., "A Study on Computational Complexity Reduction of Iterative Decoding for Turbo-coded MIMO-SDM Using Sphere Decoding," Technical Report of IEICE. RCS, Nov. 9, 2010, vol. 104, No. 675, pp. 43-48.
Taiwanese Search Report—095139893—TIPO—Dec. 30, 2010.
Tomcik, T.: "QTDD Performance Report 2," IEEE C802.20-05/88, IEEE 802.20 Working Group on Mobile Broadband Wireless Access, <http://ieee802.org/20/>, pp. 1-56, XP002386798 (Nov. 15, 2005).
Translation of Office Action in Chinese Application 2006800295980 corresponding to U.S. Appl. No. 11/260,895, citing CN1346221 and CN1383631 dated Feb. 16, 2011.
Translation of Office Action in Japan application 2008-538193 corresponding to U.S. Appl. No. 11/261,065, citing JP11196109, JP10322304 and JP09008725 dated Mar. 8, 2011.
Translation of Office Action in Korean application 10-2007-7031029 corresponding to U.S. Appl. No. 11/260,931, citing US20030202491 and KR20040063057 dated Jan. 28, 2011.
Translation of Office Action in Canadian application 2625987 corresponding to U.S. Appl. No. 11/261,065, citing CA2557369 dated Apr. 12, 2011-04-12.
Translation of Office Action in Chinese application 200680040236.1 corresponding to U.S. Appl. No. 11/261,065, citing US20040048609 and CN1402916 dated Feb. 18, 2011.
Translation of Office Action in Chinese application 200680048265.2 corresponding to U.S. Appl. No. 11/260,931, citing US6904097, W02004095851, CN1344451 dated Jan. 26, 2011.
Translation of Office Action in Chinese application 200680048832.4 corresponding to U.S. Appl. No. 11/261,158, citing CN1132474 dated Dec. 31, 2010.
Translation of Office Action in Japanese Application 2008-514880 corresponding to U.S. Appl. No. 11/445,377, citing JP2007519281 and JP2006505172 dated Nov. 9, 2010.
Translation of Office Action in Japanese application 2008-528103 corresponding to U.S. Appl. No. 11/260,924, citing JP2005502218, JP2004534456, JP2003348047, JP2003199173, JP2004529524, JP11508417, JP2001238269, JP2005130491 and JP2003500909 dated Feb. 8, 2011.
Translation of Office Action in Japanese Application 2008-529216 corresponding to U.S. Appl. No. 11/261,159, citing GB2348776 , W02004098222, WO2005065062 and WO2004102815. Dated Jan. 11, 2011.
Translation of Office Action in Japanese application 2008-538181 corresponding to U.S. Appl. No. 11/511,735, citing WO04064295, JP2002515203, JP8288927, JP7336323 and JP200157545 dated Jan. 25, 2011.
Voltz, P. J.,"Characterization of the optimum transmitter correlation matrix for MIMO with antenna subset selection", IEEE Transactions on Communications, vol. 51, No. 11, pp. 1779-1782, (Nov. 1, 2003).
Widdup, B. et al., "A highly-parallel Vlsi architecture for a list sphere detector," IEEE International Conference, Paris, France, vol. 5, pp. 2720-2725 (2004).
Wiesel, A. et al.: "Efficient implementation of sphere demodulation" Signal Processing Advances in Wireless Communications, 2003. SPAWC 200 3. 4TH IEEE Workshop on Rome. Italy Jun. 15-18, 2003, Piscataway, NJ, USA, IEEE, US, Jun. 15, 2003, p. 36-40, XP010713463..
Yongmei Dai, ; Sumei Sun; Zhongding Lei; Yuan Li.: "A List Sphere Decoder based turbo receiver for groupwise space time trellis coded (GSTTC) systems," 2004 IEEE 59th Vehicular Technology Conference, vol. 2, pp. 804-808, May 17, 2004, doi: 10.1109/VETECS.2004.1388940.
S. Nishimura et al., "Downlink Null-Formation Using Receiving Antenna Selection in MIMO/SDMA",Technical Search Report of Electric Information Communication Academic Conference, Feb. 28, 2002, vol. 101, No. 683, pp. 17-22, RCS 2001-286.
Alcatel-Lucent, et al., "Dedicated Reference Signals for Precoding in E-UTRA Downlink" 3GPP Draft; R1-071718, 3RD Generation Partnership Project (3GPP), Mobile Competence Centre ; 650, Route Des Lucioles ; F-06921 Sophia-Antipolis Cedex ; France, vol. Ran WG1, no. St. Julian; 20070403, Apr. 3, 2007, XP050105640 [retrieved on Apr. 3, 2007].
Bengtsson, M. et at, "A Generalization of Weighted Subspace Fitting to Full-Rank Models", IEEE Transactions on Signal Processing, IEEE Service Center, New York, NY, US, vol. 49, No. 5, pp. 1002-1012, May 1, 2001.
Dammann, a. et al., "Beamforming in Combination with Space-Time Diversity for Broadband OFDM Systems", ICC 2002. 2002 IEEE International Conference on Communications. April 28-May 2, 2002, pp. 165-171, XP010589479.
Ken Murakami et al., "Status Toward Standardization at IEEE 802.3ah and items on the construction of GE-PON system ," Technical Report of the Institute of Electronics, Information and Communication Engineers, Jun. 13, 2003, vol. 103, No. 124, pp. 1-6, IN2003-24.
Physical Channels and Multiplexing in Evolved UTRA Downlink TSG-RAN Working Group 1 Meeting, XX, XX, vol. RI-050590, Jun. 20, 2005, pp. 1-24, XP003006923 the whole document.
Siemens, "Evolved UTRA uplink scheduling and frequency reuse" [online], 3GPP TSG-RAN WG1 # 41 R1-050476, Internet <URL:http://www.3gpp.org/ftp/tsg_ran/WG1_RL1/TSGR1_41/Docs/R1-050476.zip>, May 9, 2005.
Viswanath, P. et al, "Opportunistic Beamforming Using Dumb Antennas" IEEE Transactions on Information Theory, IEEE USA, vol. 48, No. 6, Jun. 2002, pp. 1277-1294, XP002314708 ISSN: 0018-9448 abstract right-hand column, paragraph 1.
Yatawatta, S. et al., "Energy Efficient Channel Estimation in Mimo Systems", 2005 IEEE International Conference on Acoustics, Speech, and Signal Processing, Mar. 18-23, 2005, Philadelphia, vol. 4, pp. 317-320, Mar. 18, 2005.
Anonymous: "3GPP TS 36.211 V8.0.0; Evolved Universal Terrestrial Radio Access (E-UTRA); Physical channels and modulation (Release 8)" 3RD Generation Partnership Project; Technical Specification Group Radio Access Network, [Online] 2007, XP002520076 Retrieved from the Internet: URL:http://www.Sgpp.org/ftp/Specs/html-i nfo/36211.htm> [retrieved on Sep. 27, 2007] Section 5.
Jim Tomcik, QFDD and QTDD: Technology Overview, IEEE 802.20 Working Group on Mobile Broadband Wireless Access, Oct. 28, 2005, pp. 48-50, URL, Http://www.IEEE802.ORG/20/CONTRIBS/C802.20-05-68.ZIP.
Nokia: "Compact signalling of multi-code allocation for HSDPA", version 2,3GPP R1-02-0018, Jan. 11, 2002.
Sethi M, et al., "Code Reuse DS-CDMA—A Space Time Approach", Proceedings of the 2002 IEEE International Conference on Acoustics, Speech, and Signal Processing (ICASSP), pp: 2297-2300, May 13-17, 2002.
European Search Report —EP10184156—Search Authority—Munich—Jun. 14, 2012 (050676U2EPD1D2).
Miorandi D., et al., "Analysis of master-slave protocols for real-time industrial communications over IEEE 802.11 WLANs" Industrial Informatics, 2004. INDIN '04, 2nd IEEE International Conference on Berlin, Germany Jun. 24-26, 2004. Piscataway, NJ, USA IEEE, Jun. 24, 2004, pp. 143-148, XP010782619, ISBN 0789385136, Para 3, point B.
Bhushan N., "UHDR Overview", C30-20060522-037, Denver, CO, May 22, 2006, pp. 1- 115.
Samsung: "Uplink Transmission and Multiplexing for EUTRA", 3GPP Draft; R1-050605 UL Multiplexing, Jun. 16, 2005, XP050111420.
Tachikawa (Editor); "W-CDMA Mobile Communication Systems," John Wiley & Sons Ltd., Japan, Maruzen: pp. 82-213, Jun. 25, 2001.

\* cited by examiner

VARIED TRANSMISSION TIME INTERVALS FOR WIRELESS COMMUNICATION SYSTEM

CROSS-REFERENCE TO RELATED APPLICATIONS

This application claims the benefit of U.S. Provisional Application Ser. No. 60/711,145, filed Aug. 24, 2005, entitled "Varied Transmission Time Intervals For Wireless Communication System," the entirety of which is incorporated herein by reference.

REFERENCE TO CO-PENDING APPLICATIONS FOR PATENT

The present Application for Patent is related to the following co-pending U.S. Patent Applications:

"Puncturing Signaling Channel For A Wireless Communication System," U.S. patent application Ser. No. 11/260,931, filed concurrently herewith, assigned to the assignee hereof, and expressly incorporated by reference herein; and "Mobile Wireless Access System," U.S. Patent Application No. 60/731,013, filed concurrently herewith, assigned to the assignee hereof, and expressly incorporated by reference herein; and "Method And Apparatus For Providing Antenna Diversity In A Wireless Communication System," U.S. patent application Ser. No. 11/261,823, filed concurrently herewith, assigned to the assignee hereof, and expressly incorporated by reference herein.

BACKGROUND

I. Field

The following description relates generally to wireless communication networks and more particularly to varied transmission time interval size for forward link and reverse link transmissions in multi-user wireless systems.

II. Background

Wireless networking systems are utilized by many to communicate wherever the user may be located at a particular time (e.g., home, office, traveling, . . . ). Wireless communication devices have become smaller and more powerful to meet user needs while improving portability and convenience. Users have found many uses for wireless communication devices including cellular telephones, personal digital assistants (PDAs) and the like.

A typical wireless communication network (e.g., employing frequency, time, and code division techniques) includes one or more base stations that provide a coverage area and one or more mobile (e.g. wireless) user devices that can transmit and receive data within the coverage area. A typical base station can simultaneously transmit multiple data streams for broadcast, multicast, and/or unicast services, wherein a data stream is a stream of data that can be of independent reception interest to a user device.

Various factors can affect the efficiency and performance of wireless communication. For example, the amount of traffic or data communication occurring in a coverage area can reduce data transmission times and produce interference. The data rate can also affect wireless communication and overall throughput may be limited by the link level transmission rate. In the case of a limited transmission rate, typical packet sizes are relatively small, needing modest decoding horsepower. The transmission time intervals that should be utilized for the packets can differ depending on communication parameters or factors. For example, some packets should utilize short transmission time interval while others should utilize a longer transmission time interval to improve the wireless communication.

Based on the aforementioned, techniques for providing short transmission time interval duration to access terminals with good channel conditions, for example, can help achieve high peak throughputs. At substantially the same time, users having moderate to poor channel conditions, for example, can be provided with a long transmission time interval. In addition, flexible partitioning of bandwidth resources between short transmission time interval and long transmission time interval can benefit transmissions in multi-user wireless systems.

SUMMARY

The following presents a simplified summary of one or more embodiments in order to provide a basic understanding of some aspects of such embodiments. This summary is not an extensive overview of the one or more embodiments, and is intended to neither identify key or critical elements of the embodiments nor delineate the scope of such embodiments. Its sole purpose is to present some concepts of the described embodiments in a simplified form as a prelude to the more detailed description that is presented later.

According to a feature is a method for assigning a transmission time interval. The method includes measuring a channel condition of packet communicated by at least one wireless device. A data rate associated with the at least one wireless device is also ascertained. Next, a determination can be made whether to schedule a long transmission time interval or a short transmission time interval to the packet based in part on the detected channel condition and the ascertained data rate. A long transmission time interval can be scheduled, for example, if the channel condition is poor and/or there is a low data rate. A short transmission time interval can be scheduled if, for example, the channel condition is good and/or the data rate is high or fast. The method can be repeated for multiple wireless devices.

According to another embodiment is a processor for assigning one of multiple transmission time intervals to a user device. The system includes an optimizer that analyzes a condition of a wireless data packet and a data rate of the wireless data packet. Also included is a scheduler that schedules a transmission time interval to a packet, the transmission time interval is one of a long transmission time interval and a short transmission time interval.

According to another embodiment is a scheduler that schedules a user device to bandwidth and a transmission time interval. The scheduler can include a bandwidth module that determines a bandwidth to apply to each user device. The scheduler can also include a transmission time interval module that establishes whether the user device should have a short transmission time interval or a long transmission time interval. The transmission time interval module can also receive and analyze channel condition information and data rate information.

According to another embodiment is a system for scheduling wireless user devices to different transmission time intervals. The system can include means for ascertaining a channel condition for each user device. Also included in system can be a means for supporting at least two different interlacing structures. A means for scheduling each user device a respective transmission time interval can also be included in system.

According to yet another embodiment is a computer-readable medium having stored thereon computer-executable instructions for detecting a packet channel condition and ascertaining a packet data rate. The computer-readable medium can further have instructions for scheduling a long transmission time interval or a short transmission time interval to the packet based in part on the detected channel condition and the ascertained data rate. In another embodiment, the instructions can include scheduling a long transmission time interval if the packet channel condition is poor or the data rate is slow and/or scheduling a short transmission time interval if the packet channel condition is good or the data rate is fast.

To the accomplishment of the foregoing and related ends, one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "component," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Figure 1:
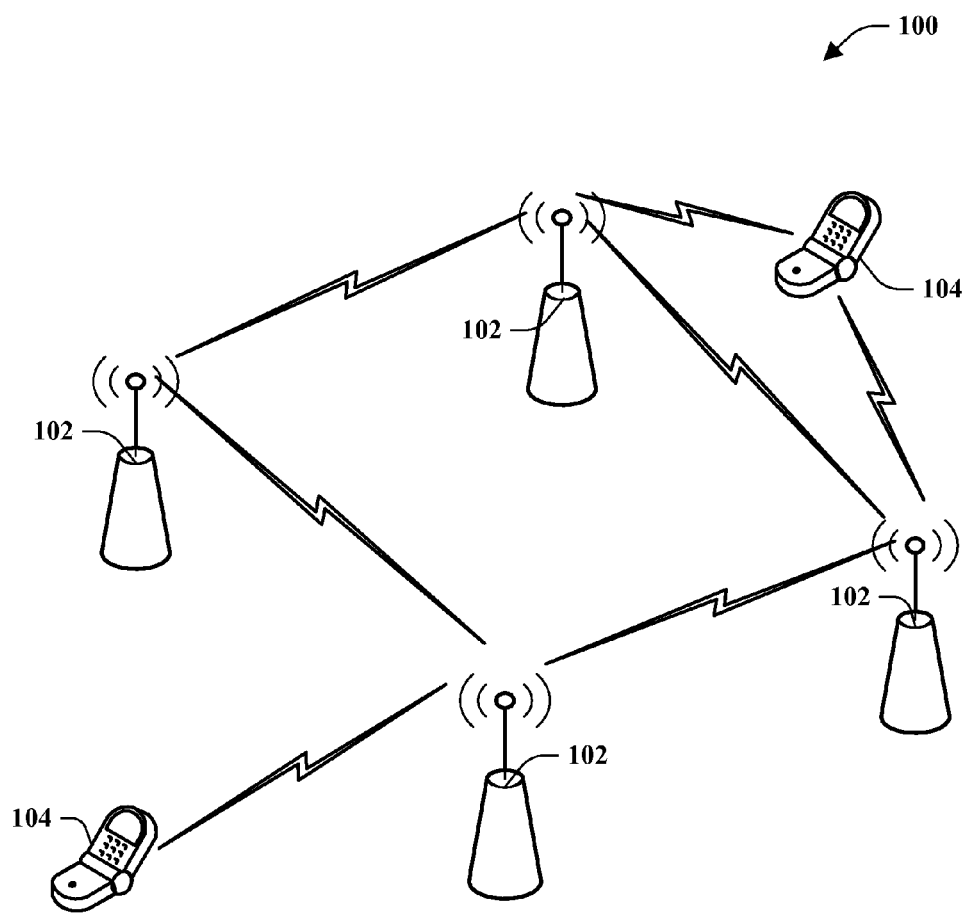
FIG. 1 illustrates a wireless communication system in accordance with various embodiments presented herein.

Referring now to the drawings, FIG. 1 illustrates a wireless communication system 100 in accordance with various embodiments presented herein. System 100 can comprise one or more access point(s) 102 that receive, transmit, repeat, etc., wireless communication signals to each other and/or to one or more mobile devices 104. Access point(s) 102 can represent an interface between wireless system 100 and a wired network (not shown).

Each access point 102 can comprise a transmitter chain and a receiver chain, each of which can in turn comprise a plurality of components associated with signal transmission and reception (e.g., processors, modulators, multiplexers, demodulators, demultiplexers, antennas, . . . ). Mobile devices 104 can be, for example, cellular phones, smart phones, laptops, handheld communication devices, handheld computing devices, satellite radios, global positioning systems, PDAs, and/or other suitable devices for communicating over wireless system 100. In wireless system 100, the periodic transmission of small data packets (commonly referred to as beacons) from access point 102 can make known the presence of wireless system 100 and transmit system 100 information. Mobile devices 104 can sense the beacons and attempt to establish a wireless connection to access points 102 and/or to other mobile devices 104.

System 100 facilitates scheduling varied transmission time intervals (TTIs) to one or more users using mobile device(s) 104 to accommodate the communication channels and network conditions. System 100 can automatically detect, receive, and/or infer a channel condition, bandwidth, data rate, and/or various other communication parameters to determine whether a long TTI or a short TTI is best for the data transmission.

A component located in mobile device 104 can operate in conjunction with one or more access point 102 to facilitate monitoring the capabilities of the mobile device 104, such as the device's 104 decoding capabilities. Alternatively or in addition, the access point 102 can detect this information and schedule the respective data packets to an optimal TTI duration taking into account the various communication parameters, including the amount of traffic in the network.

Figure 2:
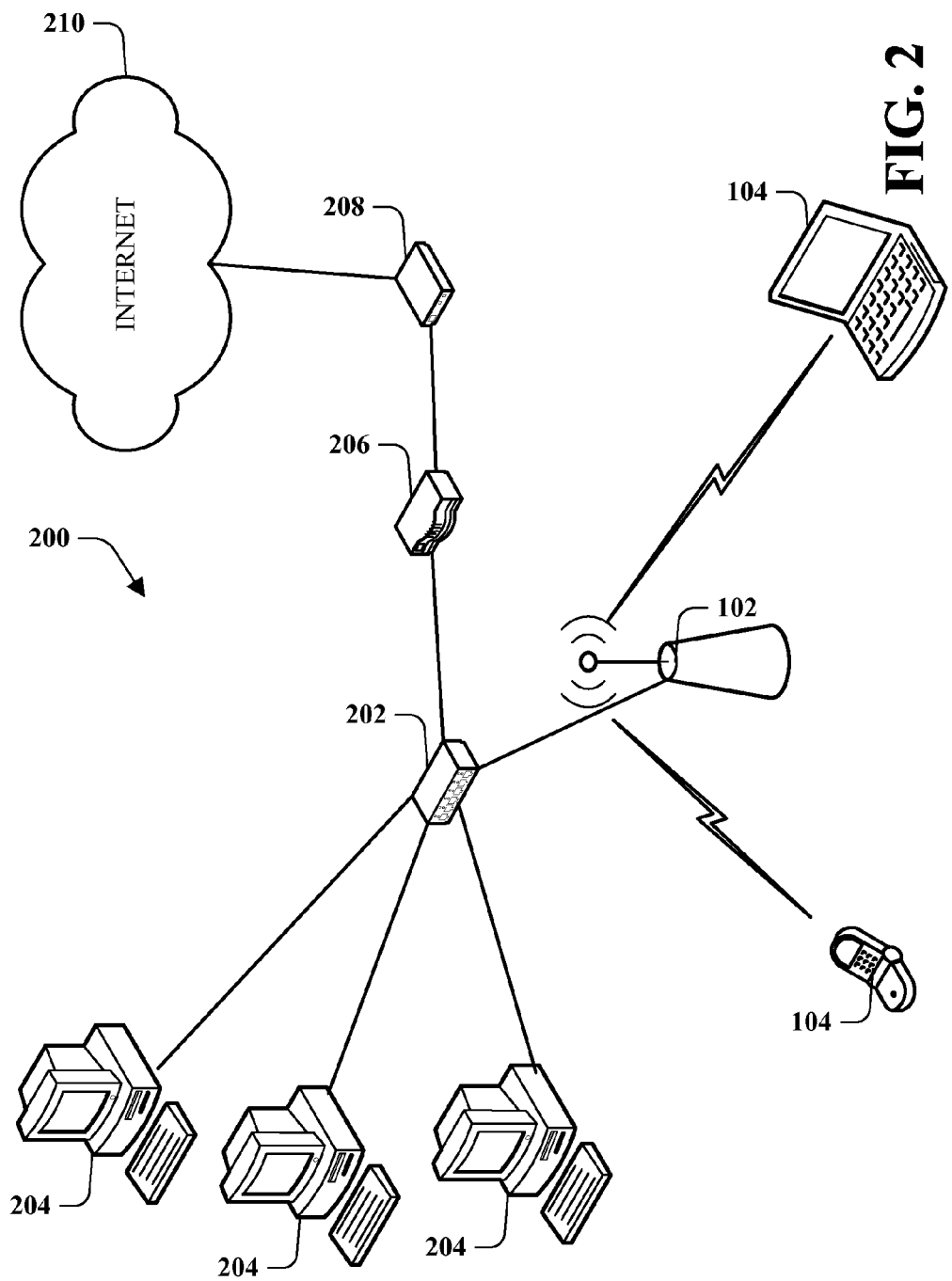
FIG. 2 illustrates a multiple access wireless communication system according to one or more embodiments.

FIG. 2 is an illustration of a multiple access wireless communication system according to one or more embodiments. Illustrated is a system 200 that can include a wireless local area network associated with a wired local area network (LAN). Access point 102 can be in communication with mobile devices 104. Access point 102 is connected to an Ethernet hub or switch 202 for a LAN. Ethernet hub 202 may be connected to one or more electronic devices 204 that can include personal computers, peripheral devices (e.g., facsimile machines, copiers, printers, scanners, etc.), servers, and the like. Ethernet hub 202 can be connected to a router 206 that transmits data packets to a modem 208. Modem 208 can transmit data packets to a wide area network (WAN) 210, such as the Internet. System 200 illustrates a single, simple network configuration. Many additional configurations of system 200 including alternative electronic devices are possible. Although system 200 has been illustrated and describe with reference to a LAN, it is possible that system 200 can utilize other technologies including Wireless Wide Area Network (WWAN) and/or Wireless Personal Area Network (WPAN) either separately or concurrently.

System 200 can facilitate scheduling different users to different TTI durations. By way of example and not limitation, if a channel is causing traffic or is slowly changing, it can benefit from a longer TTI for channel estimation. Thus, it can hold a certain amount of energy for channel estimation that provides a particular accuracy. The tradeoff between a short TTI and a long TTI is that with a short TTI some performance is lost, however, it allows a better processing time.

Figure 3:
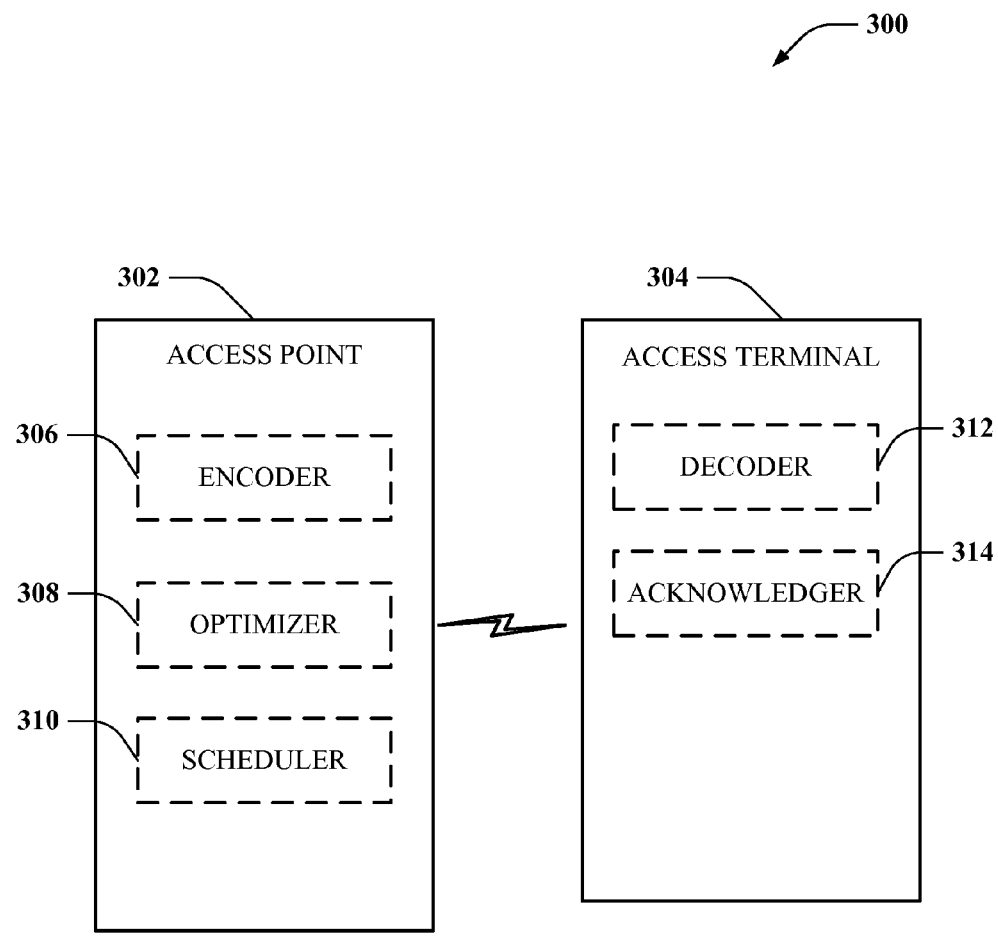
FIG. 3 illustrates a system for a varied transmission time interval size for forward link and reverse link transmissions in multi-user wireless systems.

FIG. 3 illustrates a system 300 for a varied TTI size or duration for forward link and reverse link transmissions in multi-user wireless systems. System 300 includes an access point 302 and an access terminal 304. It should be understood that system 300 can include more than one access point 302 and/or more than one access terminal 304, however, only one of each is illustrated for ease of explanation.

Access point 302 can include an encoder 306, an optimizer 308, and a scheduler 310. These can be functional blocks that represent functions implemented by a processor, software or combination thereof (e.g., firmware). Encoder 306 is configured to encode signals and/or data packets for transmission to access terminal 304. In other embodiments, the optimizer 308 and/or scheduler 310 are associated with access terminal 304 and access terminal 304 performs the functionalities described below.

Optimizer 308 can be configured to optimize a communication between access point 302 and access terminal 304 and/or between two or more access terminals. Optimizer 308 can utilize information regarding a channel condition, bandwidth, packet size, data rate, and other parameters to optimize the communication. This information can be communicated to scheduler 310. Optimizer 308 can further support at least two different interlacing structures or two different kinds of assignments.

Scheduler 310 can be configured to schedule an access terminal (or user thereof) to a particular bandwidth and or TTI. A packet size or the number of bits that can be transmitted together depends on the TTI since a longer TTI allows more bits to be sent together. Scheduler 310 can utilize the information received from optimizer 308 and/or from the access terminal 302 to make a determination as to the TTI size. For example, access terminal 304 can notify access point 302 and/or scheduler 310 to change the scheduling from a short TTI to a long TTI or vice versa. Access terminal 304 can make such a request if it is not getting the entire data packet, has problems with the communication, if there is a large data packet being received and/or sent, is receiving the communication at a high rate, etc.

Generally, a short TTI duration can be beneficial for access terminal(s) with good channel conditions since short TTI is instrumental to achieve high pick throughputs. Alternatively, long TTI is can be utilized for users in moderate to poor channel conditions. In a system where both types of users are dynamically supported, flexible partitioning of bandwidth resources between short and long TTI, or an alternative interlacing structure can be provided.

Access terminal 304 can include a decoder 312 and an acknowledger 314. Decoder 312 can decode a received signal and/or data packets therein for processing. Acknowledger 314 can employ an acknowledgment technique in conjunction with an ACK/NACK protocol. In other embodiments, access terminal 304 can include memory (not shown) and a processor (not shown) to allow access terminal 304 to process and/or store information.

Access terminal 304 can report its capabilities, including decoder size and what it can handle in terms of decoding. This information can be transmitted to access point 302, for example, when access terminal 304 connects to system 300 and periodically or continuously while access terminal 304 is associated with system 300. With this information, access point 302 can ascertain whether access terminal 304 is a strong or weak access terminal. For example, access point 302 may schedule access terminal 304 a large bandwidth in a large channel packet. If a channel causes traffic or is slowly changing, it can benefit from a larger TTI for channel estimation because it can hold a certain amount of energy for channel estimation. A shorter TTI allows a better processing time. Thus, for different types of communication (e.g., voice, data, image, video, . . . ), access point 302 may schedule a larger TTI or a shorter TTI depending on the best optimization for that particular channel and communication.

Figure 4:
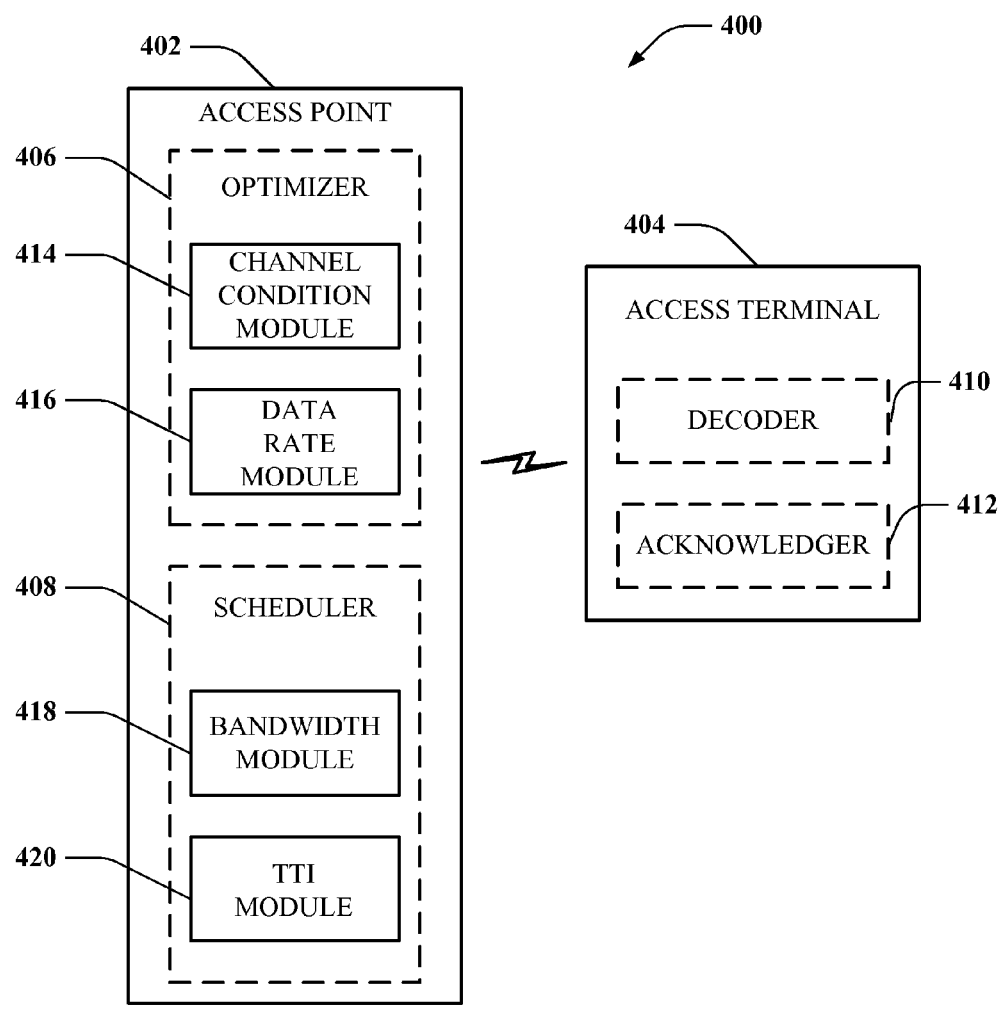
FIG. 4 illustrates a system for a varied transmission time interval size utilizing a channel condition and other communication parameters.

FIG. 4 illustrates a system 400 for a varied transmission time interval size utilizing a channel condition and other communication parameters. System 400 includes an access point 402 in wireless communication with an access terminal 404. Access point 402 can include an optimizer 406 and a scheduler 408. Access terminal 404 can include a decoder 410 that can decode a received signal and/or data packets therein for processing. Access terminal 404 can also include an acknowledger 412 that can employ an acknowledgment technique in conjunction with an ACK/NACK protocol. It should be understood that these can be functional blocks that represent functions implemented by a processor, software or combination thereof (e.g., firmware).

It should be understood that while the following is discussed with reference to access point 402, in other embodiments the functionalities can be performed by access terminal 404 and communicated to access point 402. Optimizer 406 can include a channel condition module 414 and a data rate module 416. Channel condition module 414 can be configured to analyze the condition of a channel. The channel condition can include parameters, such as the amount of network traffic, the amount of data sent/received within the network, etc. Data rate module 416 can be configured to determine a data rate of a current communication and/or an optimal data rate for a particular communication.

Scheduler 408 can include a bandwidth module 418 and a time transmission interval (TTI) module 420. The bandwidth module 418 is configured to determine a bandwidth for a communication. For example, if there are a number of users that operate on long TTI and others on short TTI, it might be desirable to give all the bandwidth to one user. For example, bandwidth module 418 can wait until the other users terminate because they follow different time lines. As the users terminate, it frees up the bandwidth.

The TTI module 420 is configured to schedule a particular communication to a short TTI or a long TTI. The TTI should be as long as possible in order to benefit from channel estimation. This is useful in systems, such as block-hopping systems where the user receives resources in units of blocks.

In some retransmission embodiments, scheduler 408 can add an extra bit to the Forward Link Assignment Message (FLAM) or Reverse Link Assignment Message (RLAM), indicating the interlacing structure for the particular packet. Link Assignment Messages (LAMs) can notify devices of a modification in resources: hop ports changes, packet formats, and so forth. In this embodiment the LAM would index the same set of hop-ports but now applies to a larger set of physical frames. The scheduler 408 additionally would make sure this LAM does not collide with other LAMs that is may have sent out earlier, especially if those other LAMs have different interlacing structure(s). The extra bit in the FLAM or RLAM, for example, could indicate as follows: if a "1," could indicate an interlacing structure wherein the HARQ interlace is six (6) and the PHY data interlace is three (3). If a "0," could indicate an interlacing structure wherein the HARQ interlace is eight (8) and the PHY data interlace is three (3). These are examples of an extra bit indicating an interlace structure. Many possible types and/or combinations of interlace structures can be indicated with the extra bit.

Figure 5:
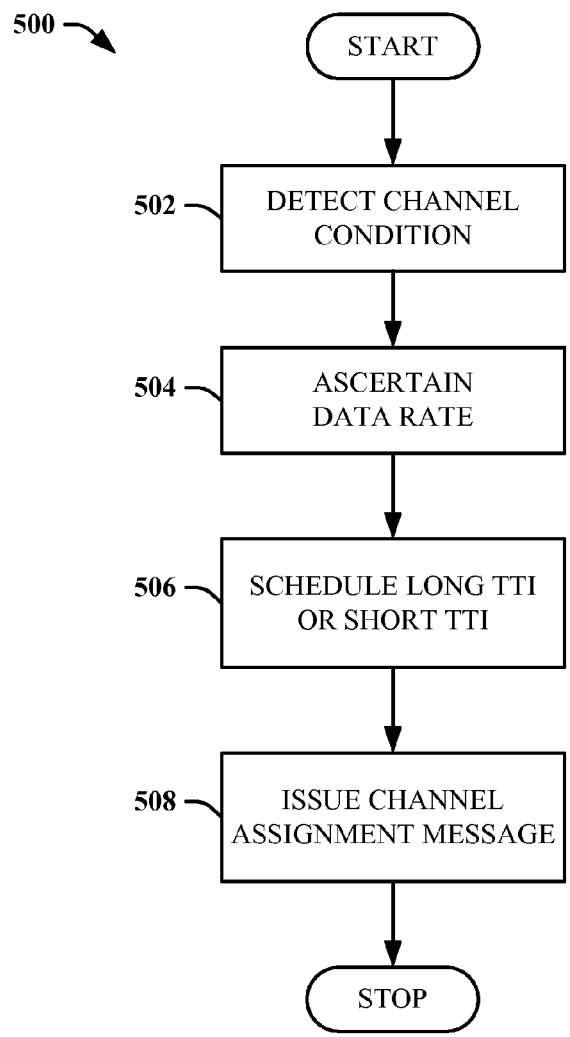
FIG. 5 illustrates flow chart of a methodology for assigning different users to different transmission time intervals.

FIG. 5 illustrates flow chart of a methodology 500 for assigning different users to different transmission time intervals. The method 500 begins, at 502, where a channel condition of a packet communicated by at least one wireless device is detected and measured. The channel condition can be poor or good depending on various criteria including traffic in the wireless network. At 504, a data rate associated with the channel is ascertained. The data rate can be a factor of the amount of bits or data to be communicated. The method continues, at 506 where a determination is made whether to schedule a long transmission time interval or a short transmission time interval to the packet based in part on the detected channel condition and the ascertained data rate. A long transmission time interval can be scheduled if the channel condition is poor and/or if the data rate is low. A short transmission time interval can be scheduled if the channel condition is good and/or the data rate is high. It should be understood that more than one wireless device packet can be analyzes and assigned a transmission time interval according to the methodology 500. For example, multiple packets can be analyzes and can be included in an alternative interlacing structure, which will be discussed more below.

In some embodiments, a channel assignment message is issued, at 508. It should be understood that the channel assignment is optional. This channel assignment message can provide information regarding the desired interlacing structure for a particular packet. According to some embodiments, an extra bit can be added to the FLAM or RLAM to indicate such a structure. For forward-link transmissions, channel assignment can be issued and transmitted on the forward-link before or at substantially the same time as the forward-link packet transmission. For reverse link transmissions, channel assignment can be issued and transmitted on the forward-link before the reverse-link packet transmission. To avoid conflicts between the different types of assignments, the entire bandwidth can be divided into two parts, one for each type of assignments, for example.

Figure 6:
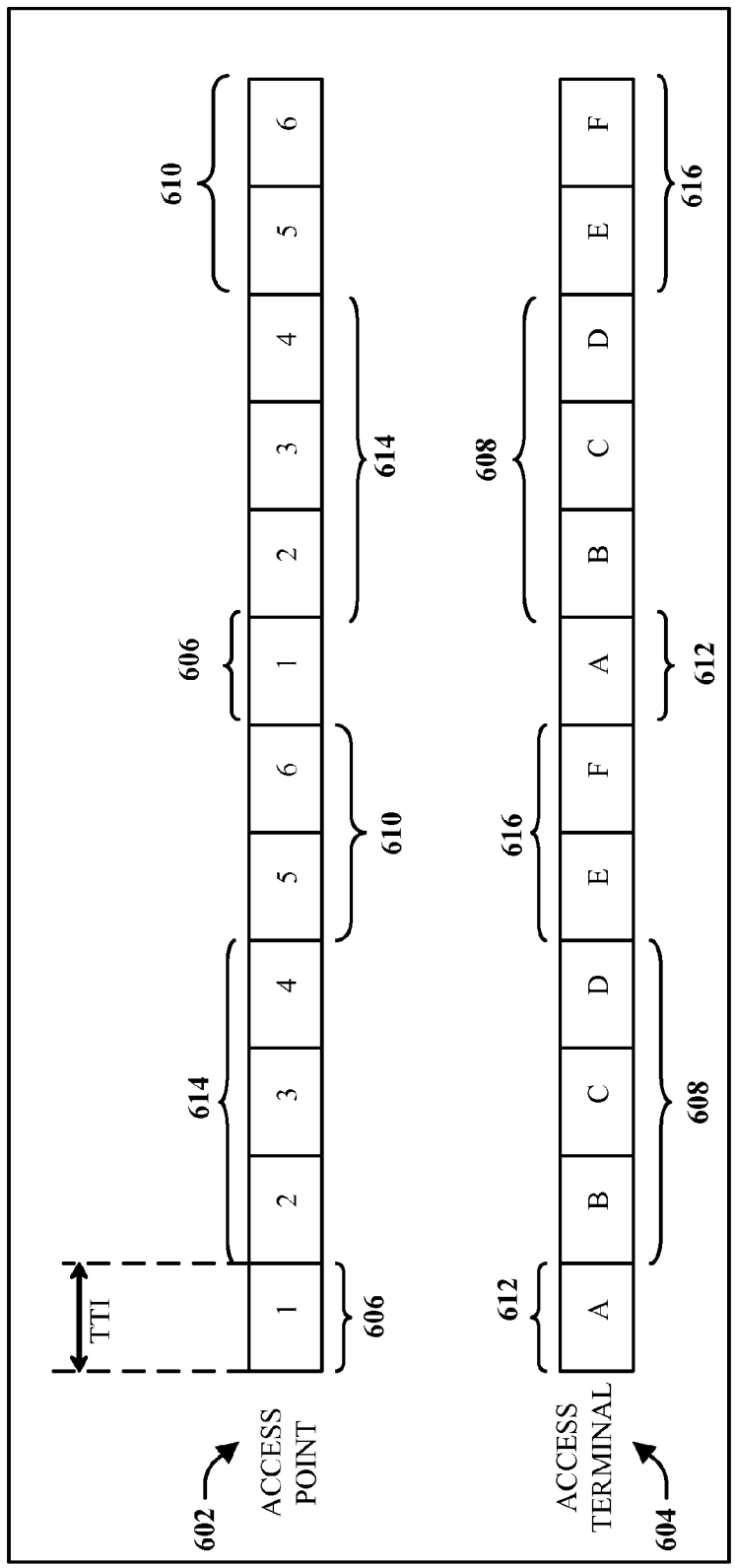
FIG. 6 illustrates a short transmission time interval having six interlaces.

FIG. 6 illustrates a short transmission time interval having six interlaces. Specifically, illustrated is a six interlace forward-link and reverse-link structure with the same transmission and retransmission delay on each interface. A multiple-access system can concurrently communicate with multiple terminals on the forward and reverse links. The forward link (or downlink) refers to the communication from the base station or access points to the terminals. The reverse link (or uplink) refers to the communication link from the terminals to the base stations or access points. The packet transmission and processing timeline for a single forward-link/reverse-link interface will now be described.

The structure for the access point is illustrated at the top of the figure at 602 having a six interlace forward-link and reverse-link structure, labeled as 1, 2, 3, 4, 5, and 6. The structure for the access terminal is illustrated at the bottom of the figure at 604 having a six interlace forward-link and reverse-link structure, labeled as A, B, C, D, E, and F. It should be understood that while both access point 602 and access terminal 604 are illustrated having two packets of data with a six interlace forward-link and reverse-link structure, there can be more or less packets of data and/or there can be more or less interlaces associated with the structure.

On the forward-link, access point 602 transmits an encoded forward-link packet at 606. This represents the first short TTI having the duration illustrated at TTI 1. Access terminal 604 decodes the forward-link packet and encodes and transmits a reverse-link acknowledgment to acknowledge that the last forward-link transmission or hybrid automatic repeat request (H-ARQ) retransmission was successfully received. The acknowledgment can be an acknowledgment technique in conjunction with an ACK/NACK protocol. The decoding and transmission of the reverse-link acknowledgment occur during 608, which represents TTIs B, C and D. The reverse-link ACK is decoded during 614 and encoding of the following forward-link transmission or H-ARQ retransmission is performed by access point 602 during TTIs 5 and 6, represented at 610.

On the reverse-link, access terminal 604 transmits an encoded reverse-link packet during TTI A, represented at 612. The reverse-link pack is decoded and a forward-link acknowledgment is sent, at 614, during TTIs labeled 2, 3, and 4. The acknowledgment confirms that the latest reverse-link transmission or H-ARQ retransmission was successfully received. At 616, the forward-link ACK is decoded and the following RL-transmission or H-ARQ retransmission is encoded.

It should be appreciated that this can process can repeat itself, as illustrated. Each transmission cycle can be accompanied by an opportunity to transmit a channel assignment message. For forward-link transmission, the channel assignment can be issued by access point 602 and transmitted on the forward-link prior to, or at substantially the same time as the forward-link packet transmission. For reverse-link transmissions, channel assignment can be issued and transmitted on the forward-link prior to the reverse-link packet transmission in a system that includes a centralized (access point) reverse-link scheduler. This is typically the case in some orthogonal reverse-link access systems. It should be understood that access terminal initiated reverse-link assignment may be used in a contention based reverse-link access system, such as DS-CDMA.

Figure 7:
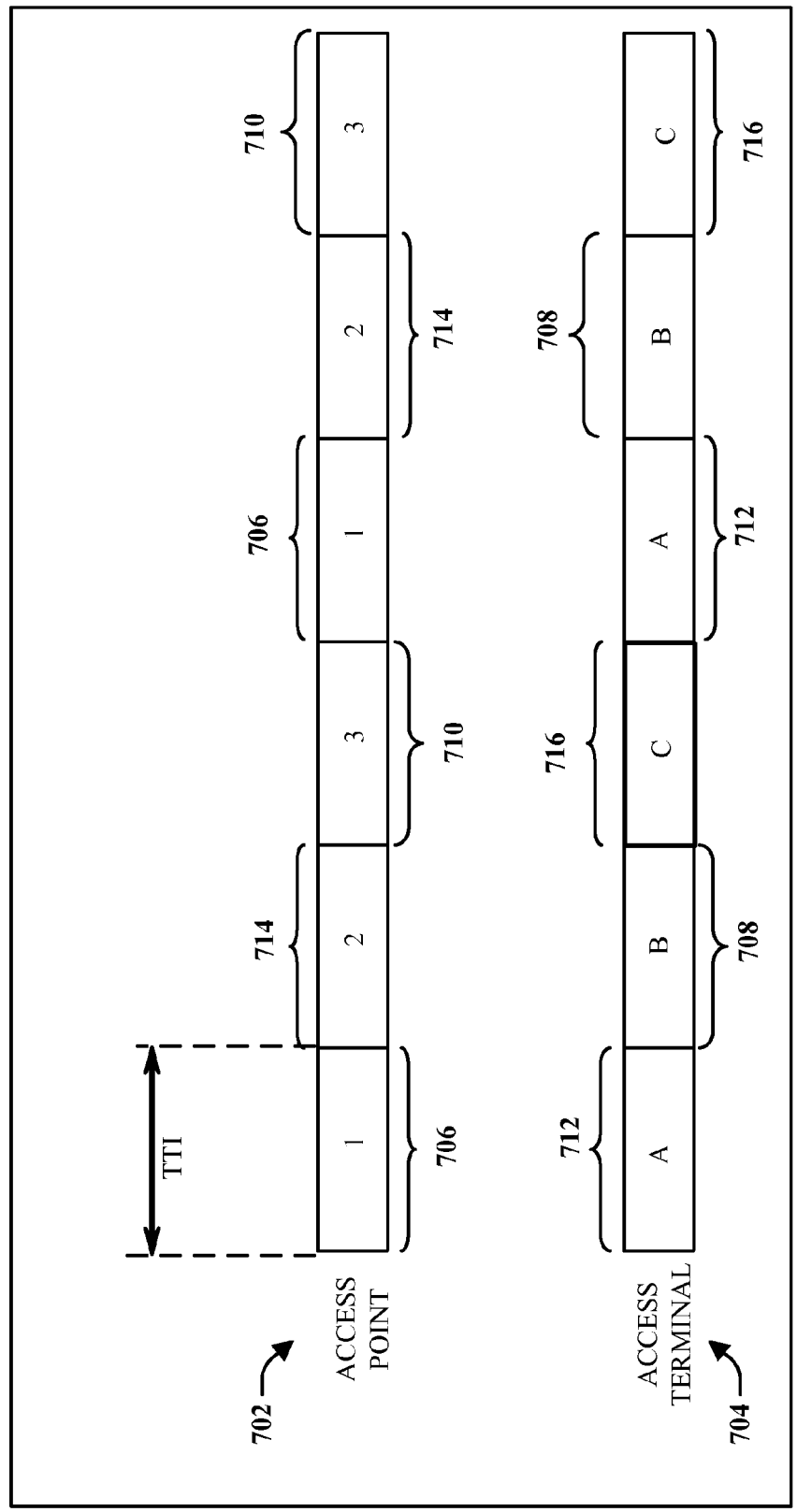
FIG. 7 illustrates a long transmission time interval having three interlaces.

With reference now to FIG. 7, illustrated is a long transmission time interval having three interlaces and in particular illustrated is a three interlace forward-link and reverse-link structure with the same transmission and retransmission delay on each interface. The three interlaces for access point 702 are labeled 1, 2, and 3, while the three interlaces for access terminal 704 are labeled A, B, and C. In this figure, the TTI duration, or the duration of the first transmission of a forward-link/reverse-link packet and the subsequent H-ARQ retransmission thereof, is twice as large as the TTI duration in FIG. 6 discussed above.

On the forward-link access point 702 transmits an encoded forward-link packet at 706 during the first TTI. Access terminal 704 decodes the forward-link packet and further encodes and transmits a reverse-link acknowledgement during 708. The acknowledger is utilized to communicate successful receipt of the last forward-link transmission or H-ARQ retransmission. The acknowledgment can be an acknowledgment technique in conjunction with an ACK/NACK protocol. A system utilizing the longer TTI, as illustrated, transmits the ACK over two physical (PHY) frames, which can save on the instantaneous power requirement for the ACK. At 710, the reverse-link ACK is decoded and encoding of the following forward-link transmission or H-ARQ retransmission is performed. In some embodiments, during the forward-link transmission, channel assignment can be issued by the access point 702 and transmitted on the forward-link either before or at substantially the same time as the forward-link packet transmission.

On the reverse-link, an encoded reverse-link packet is transmitted by access terminal 704 during 712 or TTI "A". At 714, the reverse-link packet is decoded and a forward-link acknowledgment is sent confirming successful receipt of the latest reverse-link transmission or H-ARQ retransmission. During 716, the forward-link ACK is decoded and the following RL-transmission or H-ARQ retransmission is encoded. In some embodiments, during the reverse-link transmission, channel assignment can be issued by access point 702. The assignment can be transmitted on the forward-link before the reverse-link packet transmission in systems, for example, with a centralized reverse-link scheduler. Typically this is the situation in most orthogonal reverse-link access systems. Reverse-link assignment can be used in a contention based reverse-link access systems, such as DS-CDMA.

FIGS. 6 and 7 illustrate the situation when a user receives forward-link and reverse-link transmissions on a single interlace. In general, access terminal can be scheduled multiple packets on multiple interlaces. The multiple packets can correspond to different H-ARQ processes. In addition, the forward-link and reverse-link interlaces assigned to the same access terminal do not have to be aligned in time.

Figure 8:
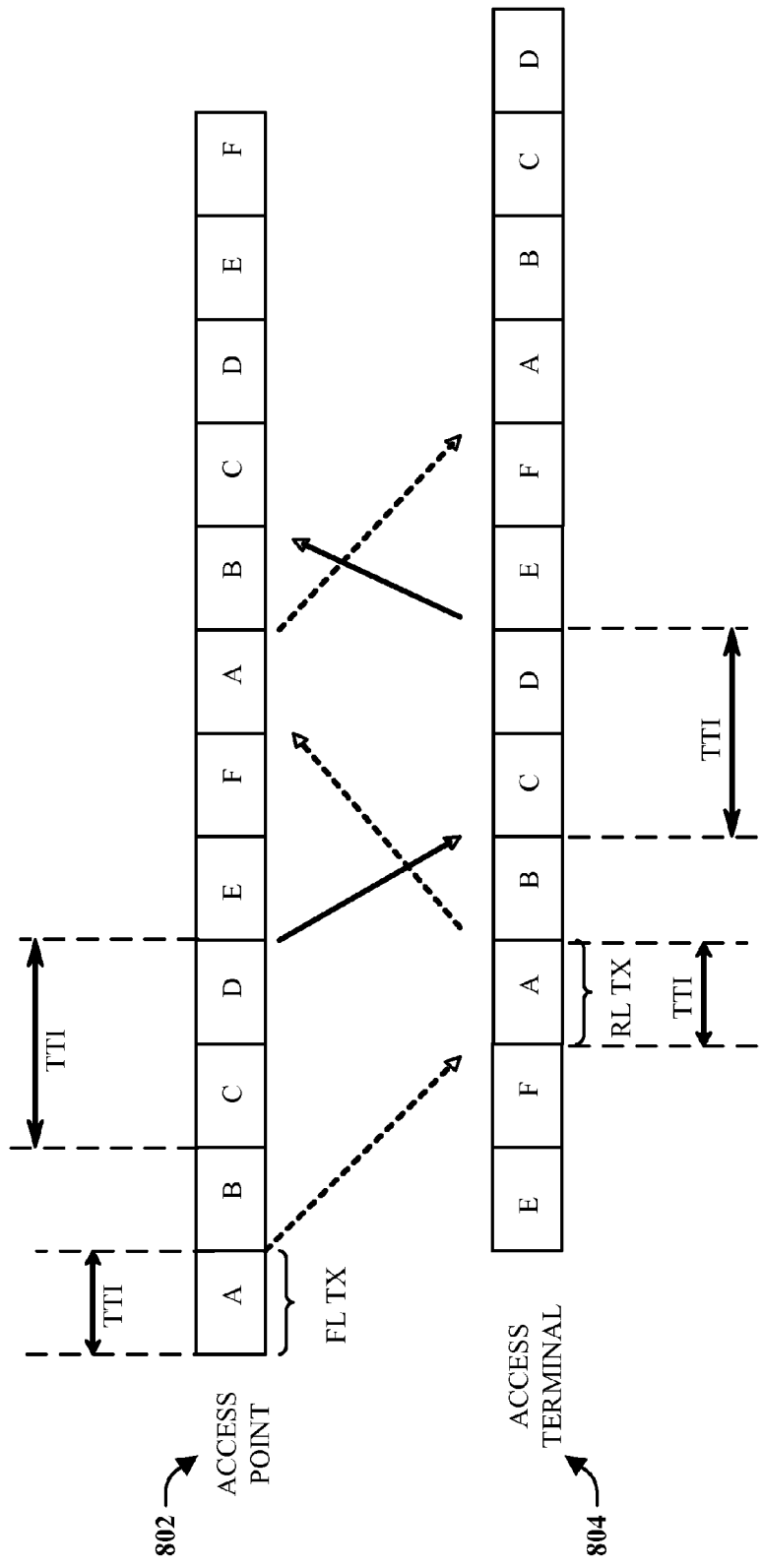
FIG. 8 illustrates flexible partitions of resources with mixed interlaces.

FIG. 8 illustrates flexible partitions of resources with mixed interlaces or an alternative interlacing structure. The time interval for access point 802 is shown at the top and the time interval for access terminal 804 is shown at the bottom of the figure. Users of short TTIs are represented as A and B, while users of long TTI's are represented as C, D, E, and F. The long TTI is approximately twice as long as the short TTI and an ACK is transmitted over two PHY frames. The alternative interlacing structure can support link budget constrained users. To avoid conflicts in this alternative interlacing structure and the two different kinds of assignments, the entire bandwidth can be divided into two parts. Each part can be dedicated for each type of assignment. It should be understood that the described way of avoiding conflicts is for example purposes only and other means to avoid conflicts between the types of assignments can be utilized.

In some embodiments, a retransmission structure (which can be a two interlace structure) can be supported by adding an extra bit to the FLAM or RLAM that indicates the desired interlacing structure for a particular packet. The LAM can index the same set of hop-ports and can also apply to a larger set of physical frames. A scheduler can ensure that the LAM does not collide with LAMs sent out earlier, especially LAMs with a different interlacing structure. This can be accomplished, for example by reserving a set of channel tree nodes for use with the alternative interlacing structure.

A CDM control channel can puncture some of the tones assigned to a channel with the alternative interlacing structure. In a regular six interlace structure, for example, the CDM control channel punctures an entire channel, which is not assigned.

In order to fully appreciate the subject disclosure, short TTI will now be compared to the long TTI option. This comparison makes the assumption that there is a fixed retransmission time in both cases. With a short TTI duration, it is possible to achieve relatively short air interface latency. The reduction in latency is particularly significant when a scheduler (e.g., scheduler 310 or 408) targets to complete packet transmission in one TTI so that no H-ARQ retransmission is necessary most of the time.

With a short TTI duration, duty cycle of traffic transmission is small relative to a long TTI duration. This means that the required data processing (decoding, scheduling and encoding) rate per interlace is lower compared to the long TTI duration. For the same spectral efficiency and assignment size, a short TTI duration yields a smaller packet size (the number of information bits) compared to the long TTI duration, assuming the same spectral efficiency and the minimum number of H-ARQ transmissions need to decode a packet for both options.

A short TTI duration can lead to a larger number of interlaces compared to a long TTI duration. Each interlace can be accompanied with the corresponding forward-link/reverse-link control such as opportunity for forward-link/reverse-link channel assignments and forward-link/reverse-link ACK. Hence, the number of forward-link/reverse-link control segments will be larger for a short TTI option. Additionally, timing of these control channels is tied to the timing of the respective interlace therefore reducing the benefit of statistical multiplexing and/or joint encoding of these control channels. In some cases, there is a limit to the achievable minimum control overhead as well as the granularity of resource partitioning between control and traffic. These factors imply a higher control overhead for the option with a short TTI duration.

Block hopping mode is commonly used for the RL traffic in orthogonal systems (such as OFDMA & LFDMA) and may be beneficial on the FL as well (e.g., OFDMA TDD). A single TTI may include one or more consecutive (TDM) blocks. In a block-hopping mode, channel and interference estimation can be done locally in every block, based on dedicated pilots (e.g., placed within this block). For slowly varying (pedestrian) access terminals, channel estimation performance depends on the number of pilot clusters across the frequency band spanned by the block as well as the total pilot energy. Hence, a longer TTI duration helps to reduce pilot overhead without performance loss. Consequently, a long TTI duration leads to a better link efficiency for slowly varying channels. It is worth mentioning that there is no fundamental link performance penalty for fast varying channels when a long TTI duration is chosen.

High data rate access terminals with good channel conditions tend to receive large channel assignments (in terms of the number of tones per interlace), to take advantage of high spectral efficiency, and can achieve a high data rate. For access terminals with very high rates at the link level, the overall throughput may be limited by the air interface turn-around time. Therefore, low air interface latency is important, calling for a short TTI duration, large assignment size and high spectral efficiency to reduce pick load of TX/RX data processing such as decoding. A large assignment per access terminal indicates a relatively low control overhead (since the assignment and ACK overhead do not scale along with the assignment size). Finally, channel estimation accuracy improves at high signal-to-noise ratios (SNRs), hence link performance penalty of a short TTI duration is not that critical. Overall, a short TTI option can be suitable for high data rate access terminals in good channel conditions.

For access terminals with low data rates and moderate to poor channel condition, the overall throughput is can be limited by the link level transmission rate, hence stringent latency requirements do not apply. Due to the limited transmission rate, typical packet sizes are relatively small resulting in modest requirements on the decoding horsepower. Consequently, a somewhat bursty processing can be tolerated. Overall, the key benefits of a short TTI duration are not very important for the access terminals with moderate channel quality. However, a short TTI duration can lead to a very small packet sizes for access terminals in poor channel conditions, given that link budget per interlace reduces along with the TTI duration. A small packet size (on the order of about 100 bits and less) entails substantial losses in coding gain, hence further hurting access terminals in poor channel conditions. From the point of view of link efficiency, it is beneficial to FDM users in poor channel conditions. Hence, multiple users can be scheduled over the same interlace thereby increasing control overhead per interlace. In this context, reducing the number of interlaces (related to the increase in TTI duration) helps to reduce control overhead. Finally, access terminals in poor channel conditions can benefit from a boost in link level performance that comes along with a long TTI duration.

Figure 9:
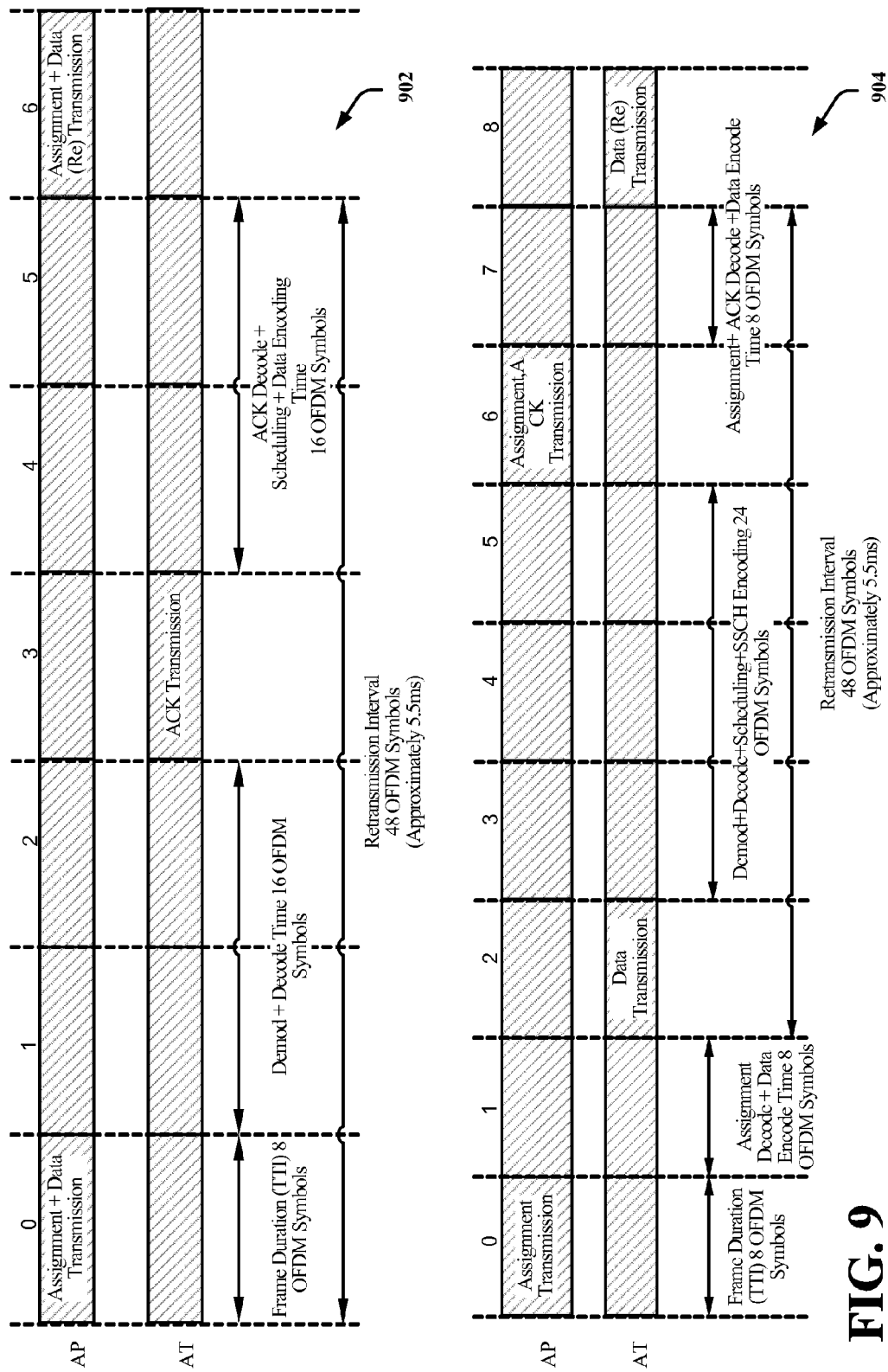
FIG. 9 illustrates an H-ARQ transmission timing.

FIG. 9 illustrates an H-ARQ transmission timing. Both forward and reverse link data transmissions support H-ARQ. To provide H-ARQ related processing time at the access point (AP) and access terminal (AT), a seven interlace structure can be utilized for the forward-link data packets and a nine interlace structure can be utilized for the reverse-link data packets. It is to be understood that more or fewer frames can be utilized and the interlace structure is for example purposes. Timing of transmissions associated with one of the seven interlaces is shown for forward-link data packets, at 902, and for reverse-link data packets, at 904. The timing of the other interlaces is the same but with all transmissions shifted by the same number of PHY frames. This interlace structure ignores the presence of the superframe preamble, that is the PHY frame level transmission timing occurs as if the superframe preamble were not present on forward-link and as if the first PHY frame were not lengthened on reverse-link.

For the forward link, assignments that arrive in forward-link PHY frame k apply to the interlace containing forward-link PHY frame k, and a forward-link transmission on forward-link PHY frame k is acknowledged on reverse-link PHY frame k+3. HARQ retransmissions associated with the transmission that starts in PHY frame k occur in PHY frames k+6n where n is the retransmission index, n=0, 1, . . . . This frame structure provides an H-ARQ retransmission latency of ~5.5 ms with 1.8 ms (2 PHY frames) of processing time at both the AT and the AP.

For the reverse-link data packets, assignments that arrive in forward-link PHY frame k apply to the interlace containing reverse-link PHY frame k+2, and a reverse-link transmission on reverse-link PHY frame k is acknowledged on forward-link PHY frame k+6. H-ARQ retransmissions associated with a transmission that starts in PHY frame k occur in PHY frames k+8n where n is the retransmission index, n=0, 1, . . . .

This frame structure provides an H-ARQ retransmission latency of 5.5 ms with 0.9 ms (1 PHY frame) of processing time at the AT, and 2.7 ms (3 PHY frames) of processing time at the AP. The reduced processing time at the AT is appropriate for reverse-link since the AT only needs to perform assignment demodulation and data packet encoding/modulation—tasks that are much simpler than data packet demodulation.

Figure 10:
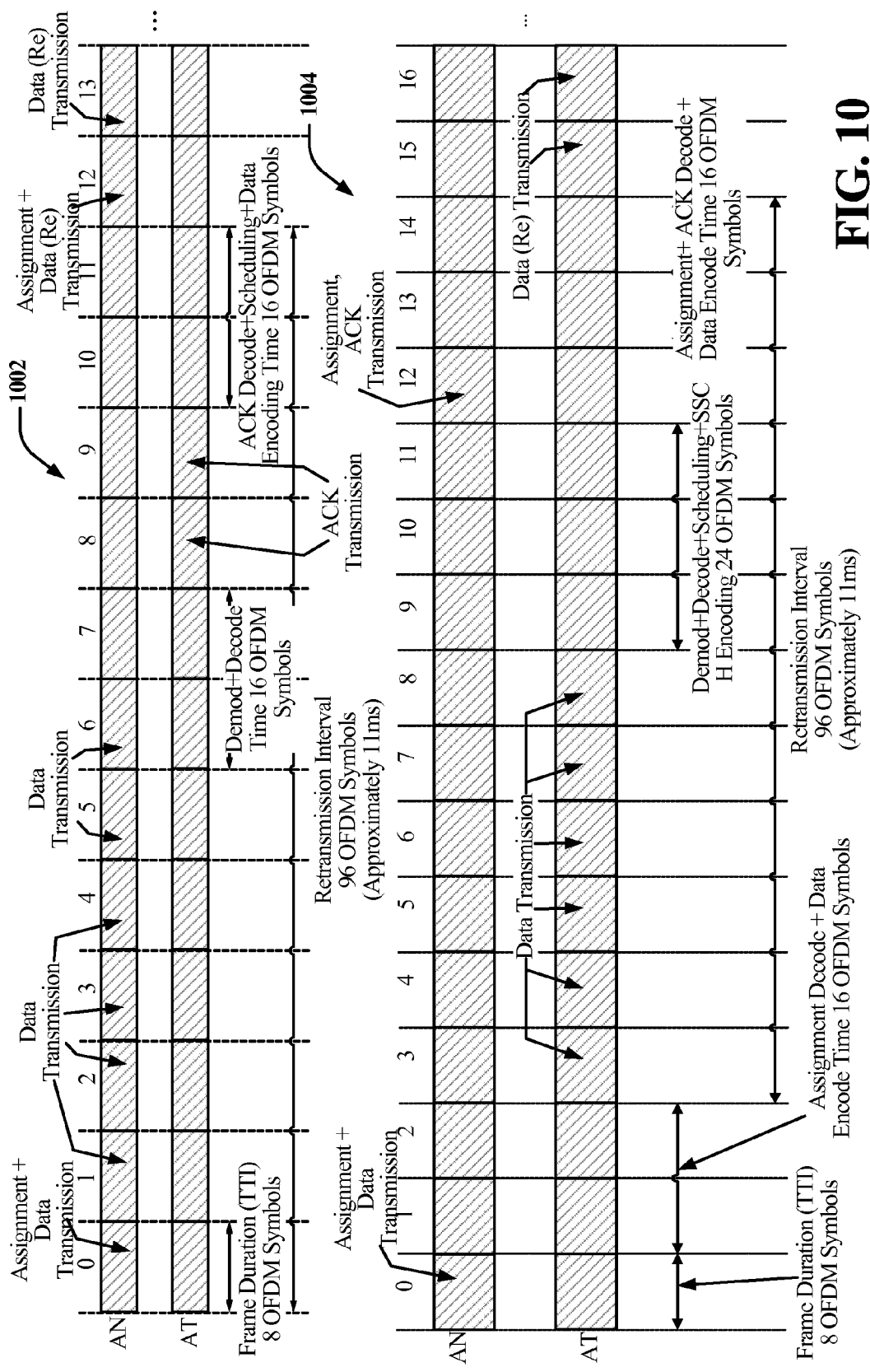
FIG. 10 illustrates an H-ARQ interlace structure for extended transmission duration assignments

With reference now to FIG. 10, illustrated is an H-ARQ interlace structure for extended transmission duration assignments. It should be understood that the examples disclosed herein are merely examples and there may be more or less frames than those shown and described in the figures. In addition to the H-ARQ interlace structure described above, an extended transmission duration assignment is provided. Such assignments can extend transmission over multiple PHY frames and can alter the timing of transmissions and corresponding ACK transmissions relative to the assignments illustrated in the above figures. The extended transmission duration assignments can be useful for link-budget limited users who can benefit from encoding transmissions over a longer transmission duration. Extended transmission duration assignments can create a potential for resource assignment collisions with standard assignments, and the access node (AN) should manage resource assignments to prevent such collisions.

For the forward-link data packets, illustrated at the top of figure, at 1002, extended transmission duration assignments that arrive in forward-link PHY frame k apply to the interlace containing forward-link PHY frames k through k+4. A forward-link transmission on forward-link PHY frames k through k+4 is acknowledged on reverse-link PHY frame k+8 through k+9. H-ARQ retransmissions associated with the transmission that starts in PHY frame k start in PHY frames k+12n where n is the retransmission index, n=0, 1, . . . . Frame structure 1002 provides an H-ARQ retransmission latency of 11 ms with 1.8 ms (2 PHY frames) of processing time at both the access terminal (AT) and the access node.

With reference now to the reverse-link data packets, illustrated at the bottom of the figure at 1004, extended transmission duration assignments that arrive in forward-link PHY Frame k apply to the interlace containing reverse-link PHY frames k+3 through k+8. A reverse-link transmission on reverse-link PHY frames k+3 through k+8 is acknowledged on forward-link PHY frame k+12. H-ARQ retransmissions associated with the transmission that starts in PHY frame k start in PHY frames k+15n where n is the retransmission index, n=0, 1, . . . . This frame structure 1004 provides an H-ARQ retransmission latency of 11 ms with 1.8 ms (2 PHY frames) of processing time at the access terminal and 2.7 ms (3 PHY frames) of processing time at the access node.

Figure 11:
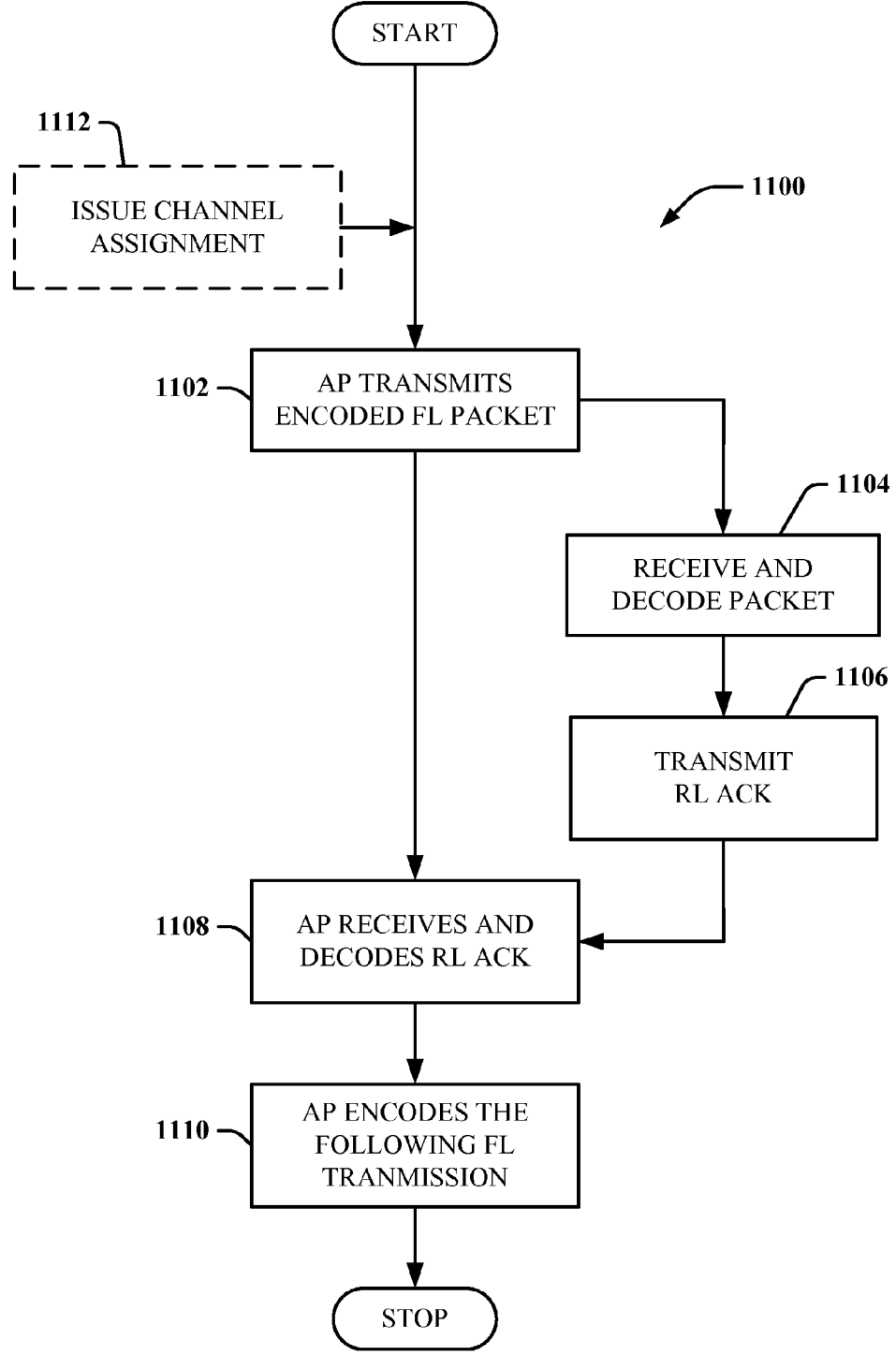
FIG. 11 illustrates a flow chart of a methodology for transmitting a forward-link data packet.

FIG. 11 is a flow chart of a methodology 1100 for transmitting a forward link data packet. The method begins, at 1102, where a forward-link packet is encoded by an access point. The encoded packet is then transmitted to an access terminal. The access terminal receives the forward-link packet and decodes the packet, at 1104. If the packet is successfully decoded, the access terminal encodes a reverse-link acknowledgement (ACK) to acknowledge successful receipt of the forward-link transmission (or hybrid automatic repeat request (H-ARQ) retransmission). The ACK is transmitted to the access point, at 1106. The reverse-link ACK is received by the access point, at 1108, and the access point decodes the reverse-link ACK. The access point, at 1110, then encodes the following forward-link transmission (or H-ARQ retransmission).

In other embodiments, each transmission cycle can be accompanied by an opportunity to transmit a channel assignment message. For forward-link transmission(s), channel assignment is issued, at 1112, and transmitted on the forward-link prior to (or at substantially the same time as) the forward-link packet transmission. It should be noted that block 1112 is shown with dotted lines to indicate that this is optional.

Figure 12:
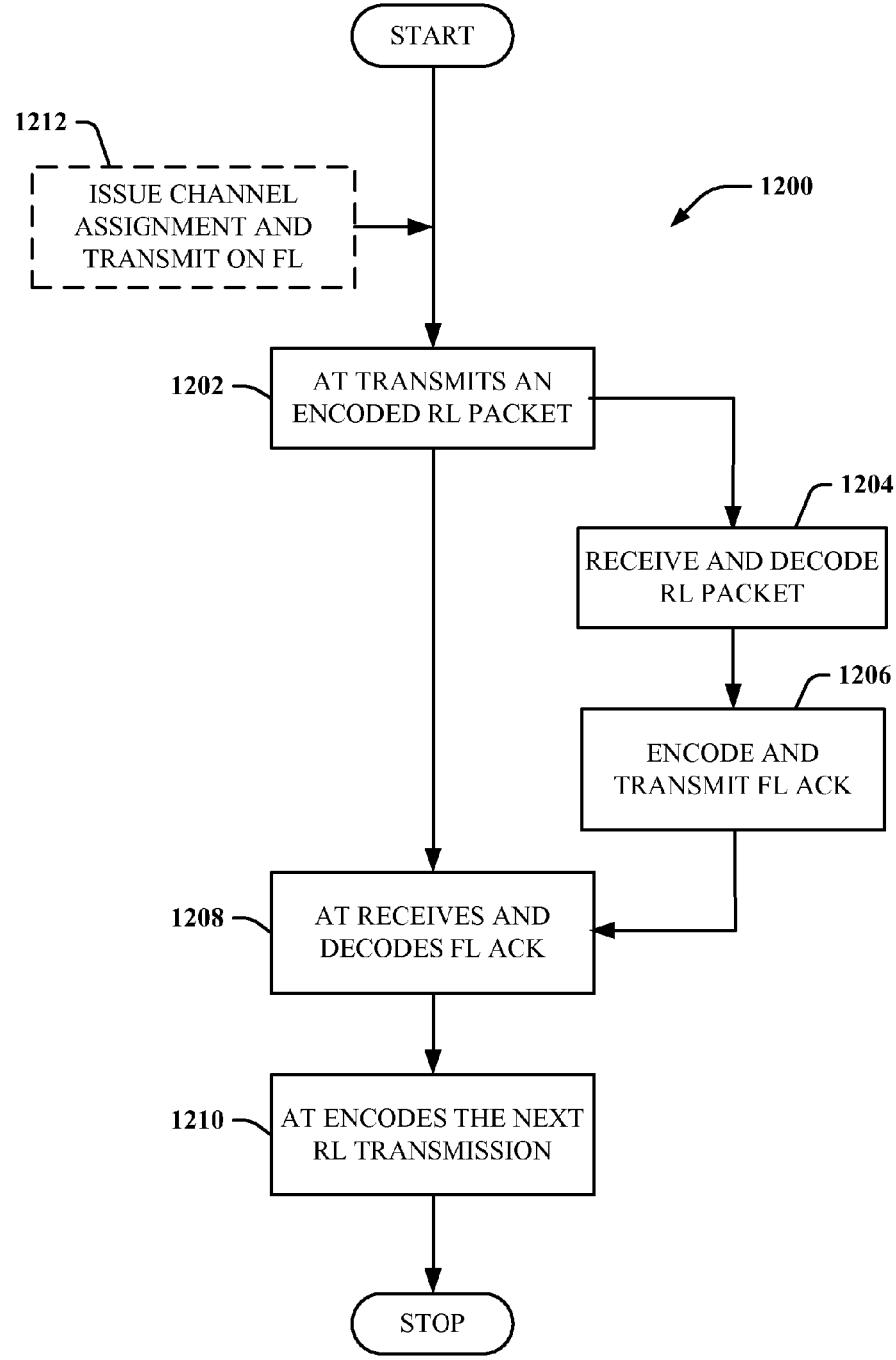
FIG. 12 is a flow chart of a methodology for transmitting a reverse-link data packet.

FIG. 12 is a flow chart of a methodology 1200 for transmitting a reverse-link data packet. The method begins, at 1202, where a reverse-link packet is encoded. This encoding can be performed by an access terminal. The encoded packet is further transmitted to a destination, which can be an access point. The encoded reverse-link packet is received and decoded, at 1204. If the packet (either the latest reverse-link transmission or H-ARQ retransmission) was successfully received and decoded, a forward-link acknowledgment (ACK) is encoded and transmitted, at 1206. The encoding and transmitting of the forward-link acknowledgment can be performed, for example, by an access point. At 1208, the forward-link acknowledgment is received, for example, at the access terminal. The next reverse-link transmission (or H-ARQ retransmission) is encoded, at 1210.

In other embodiments, the transmission cycle should be accompanied by an opportunity to transmit channel assignment message. In these embodiments, prior to transmission of an encoded reverse-link packet, at 1202, a channel assignment can be issued, at 1212. This channel assignment can be transmitted on the forward-link. Channel assignment and transmission is useful in a system with a centralized (access point) reverse-link schedule. Which is typically the case in an orthogonal reverse-link access system. It should be noted that the access point initiated reverse-link assignment may be used in a contention based reverse-link access system, such as direct sequence code division multiple access (DS-CDMA).

It should be understood that FIGS. 11 and 12 are shown and described above with reference to the situation where a user receives a forward-link data packet and transmits a reverse-link data packet on a single interlace. In general, every access terminal can be scheduled multiple packets (corresponding to different H-ARQ processes) on multiple interlaces. In addition, forward-link and reverse-link interlaces assigned to the same access terminal do not have to be aligned in time.

Figure 13:
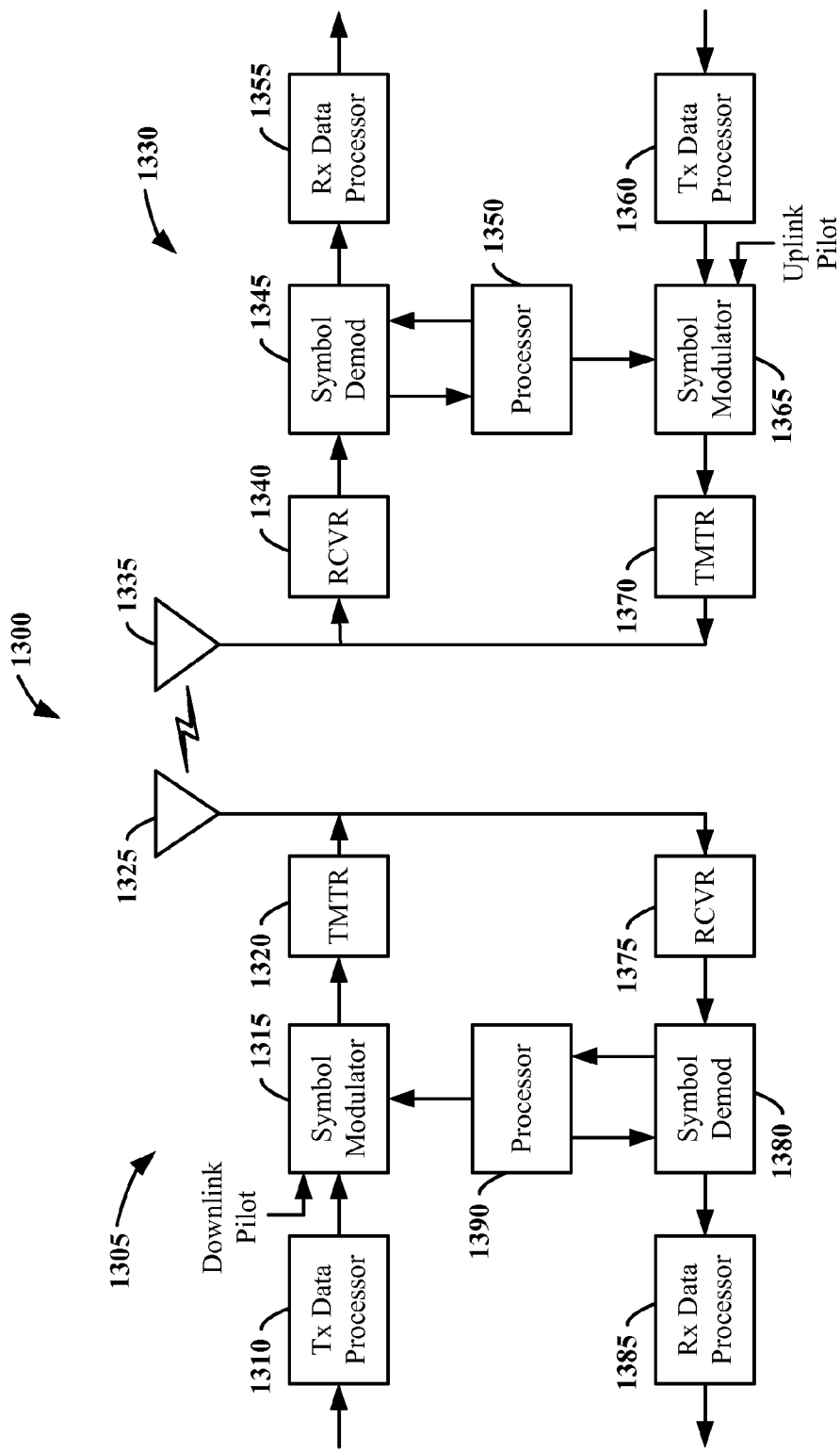
FIG. 13 illustrates a wireless communication environment that can be employed in conjunction with the various systems and methods described herein.

FIG. 13 illustrates an exemplary wireless communication system 1300. Wireless communication system 1300 depicts one base station 1305 and one terminal 1300 for sake of brevity. However, it is to be appreciated that system 1300 can include more than one base station or access point and/or more than one terminal or user device, wherein additional base stations and/or terminals can be substantially similar or different for the exemplary base station and terminal described below. In addition, it is to be appreciated that the base station and/or the terminal can employ the systems and/or methods described herein to facilitate wireless communication there between.

Referring now to FIG. 13, on a downlink, at access point 1305, a transmit (TX) data processor 1310 receives, formats, codes, interleaves, and modulates (or symbol maps) traffic data and provides modulation symbols ("data symbols"). A symbol modulator 1315 receives and processes the data symbols and pilot symbols and provides a stream of symbols. A symbol modulator 1315 multiplexes data and pilot symbols and obtains a set of N transmit symbols. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

A transmitter unit (TMTR) 1320 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1325 to the terminals. At terminal 1330, an antenna 1335 receives the downlink signal and provides a received signal to a receiver unit (RCVR) 1340. Receiver unit 1340 conditions (e.g., filters, amplifies, and frequency downconverts) the received signal and digitizes the conditioned signal to obtain samples. A symbol demodulator 1345 obtains N received symbols and provides received pilot symbols to a processor 1350 for channel estimation. Symbol demodulator 1345 further receives a frequency response estimate for the downlink from processor 1350, performs data demodulation on the received data symbols to obtain data symbol estimates (which are estimates of the transmitted data symbols), and provides the data symbol estimates to an RX data processor 1355, which demodulates (e.g., symbol demaps), deinterleaves, and decodes the data symbol estimates to recover the transmitted traffic data. The processing by symbol demodulator 1345 and RX data processor 1355 is complementary to the processing by symbol modulator 1315 and TX data processor 1310, respectively, at access point 1305.

On the uplink, a TX data processor 1360 processes traffic data and provides data symbols. A symbol modulator 1365 receives and multiplexes the data symbols with pilot symbols, performs modulation, and provides a stream of symbols. A transmitter unit 1370 then receives and processes the stream of symbols to generate an uplink signal, which is transmitted by the antenna 1335 to the access point 1305.

At access point 1305, the uplink signal from terminal 1330 is received by the antenna 1325 and processed by a receiver unit 1375 to obtain samples. A symbol demodulator 1380 then processes the samples and provides received pilot symbols and data symbol estimates for the uplink. An RX data processor 1385 processes the data symbol estimates to recover the traffic data transmitted by terminal 1330. A processor 1390 performs channel estimation for each active terminal transmitting on the uplink.

Processors 1390 and 1350 direct (e.g., control, coordinate, manage, etc.) operation at access point 1305 and terminal 1330, respectively. Respective processors 1390 and 1350 can be associated with memory units (not shown) that store program codes and data. Processors 1390 and 1350 can also perform computations to derive frequency and impulse response estimates for the uplink and downlink, respectively.

In view of the exemplary systems shown and described above, methodologies, which may be implemented in accordance with one or more aspects are provided. While, for purposes of simplicity of explanation, the methodologies are shown and described as a series of acts (or function blocks), it is to be understood and appreciated that the methodologies are not limited by the order of acts, as some acts may, in accordance with these methodologies, occur in different orders and/or concurrently with other acts from that shown and described herein. Moreover, not all illustrated acts may be required to implement a methodology in accordance with one or more aspects of the disclosed embodiments. It is to be appreciated that the various acts may be implemented by software, hardware, a combination thereof or any other suitable means (e.g., device, system, process, component) for carrying out the functionality associated with the acts. It is also to be appreciated that the acts are merely to illustrate certain aspects presented herein in a simplified form and that these aspects may be illustrated by a lesser and/or greater number of acts. Moreover, not all illustrated acts may be required to implement the following methodologies. Those skilled in the art will understand and appreciate that a methodology could alternatively be represented as a series of interrelated states or events, such as in a state diagram.

For a multiple-access system (e.g., FDMA, OFDMA, CDMA, TDMA, etc.), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1390 and 1350.

It is to be understood that the embodiments described herein may be implemented by hardware, software, firmware, middleware, microcode, or any combination thereof. When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A method for assigning a transmission time interval, comprising:
    measuring a channel condition based on at least one packet communicated by at least one wireless device;
    ascertaining a data rate associated with the at least one wireless device;
    determining whether to schedule a long transmission time interval or a short transmission time interval for an encoded packet based on the measured channel condition and the ascertained data rate; and
    indicating an interlacing structure from at least one of a plurality of interlacing structures for the encoded packet, wherein the interlacing structure for the encoded packet is indicated by adding an extra bit to a forward link assignment message (FLAM) or a reverse link assignment message (RLAM).

2. The method of claim 1, further comprising:
    scheduling a long transmission time interval if the channel condition is poor and there is a low data rate.

3. The method of claim 2, wherein the interlacing structure for the encoded packet comprises an interlace of three for a forward and a reverse link.

4. The method of claim 1, further comprising:
    scheduling a short transmission time interval if the channel condition is good and the data rate is high.

5. The method of claim 3, wherein the interlacing structure for the encoded packet comprises an interlace of six for a forward and a reverse link.

6. The method of claim 1, further comprising:
    measuring a channel condition of at least a second wireless device;
    ascertaining a data rate associated with the at least a second wireless device;
    determining whether to schedule a long transmission time interval or a short transmission time interval to the at least a second wireless device based in part on the measured channel condition and the ascertained data rate of the at least a second wireless device; and
    transmitting the transmission time interval of the first wireless device at substantially the same time as the transmission time interval of the second wireless device.

7. A processor that executes instructions for assigning one of multiple transmission time intervals to a user device, comprising:
    an optimizer that analyzes a condition of a wireless data packet and a data rate of the wireless data packet; and
    a scheduler that schedules a transmission time interval for an encoded packet, wherein the transmission time interval is either one of a long transmission time interval or a short transmission time interval and that indicates an interlacing structure from at least one of a plurality of interlacing structures for the encoded packet, and that communicates the interlacing structure for the encoded packet by adding an extra bit to a forward link assignment message (FLAM) or a reverse link assignment message (RLAM).

8. The processor of claim 7, the scheduler schedules a long transmission time interval if the analyzed condition is poor or if the data rate is low.

9. The processor of claim 8, wherein the interlacing structure for the encoded packet comprises an interlace of three for a forward and a reverse link.

10. The processor of claim 9, the scheduler schedules a short transmission time interval if the analyzed condition is good or if the data rate is high.

11. The processor of claim 10, wherein the interlacing structure for the encoded packet comprises an interlace of six for a forward and a reverse link.

12. The processor of claim 7, wherein the forward-link assignment message (FLAM) is transmitted on the forward-link prior to or at substantially the same time as a forward-link packet transmission.

13. The processor of claim 7, wherein the forward-link assignment message (FLAM) is transmitted on the forward-link prior to a reverse-link packet transmission.

14. A scheduler that schedules a user device to bandwidth and a transmission time interval, comprising:
    a bandwidth module that determines a bandwidth to apply to each user device;

a transmission time interval module that establishes whether each user device should have a short transmission time interval or a long transmission time interval; and wherein the scheduler indicates an interlacing structure from at least one of a plurality of interlacing structures for each user device by adding an extra bit to a forward link assignment message (FLAM) or a reverse link assignment message (RLAM) to indicate the interlacing structure for each user device.

15. The scheduler of claim 14, the transmission time interval module further receives channel condition information and data rate information.

16. The scheduler of claim 15, a short transmission time interval is scheduled if the channel condition is good and the data rate is fast.

17. The scheduler of claim 16, wherein the interlacing structure for each user device comprises an interlace of six for a forward and a reverse link.

18. The scheduler of claim 16, a long transmission time interval is scheduled if the channel condition is moderate and the data rate is slow.

19. The scheduler of claim 18, wherein the interlacing structure for each user device comprises an interlace of three for a forward and a reverse link.

20. An apparatus for scheduling wireless user devices to different transmission time intervals, comprising:

means for ascertaining a channel condition for each user device;

means for indicating an interlacing structure from at least one of a plurality of interlacing structures for each user device by adding an extra bit to a forward link assignment message (FLAM) or a reverse link assignment message (RLAM) to indicate the interlacing structure for each user device; and means for scheduling each user device a respective transmission time interval.

21. The apparatus of claim 20, further comprising:

means for communicating the respective transmission time interval along with a wireless communication.

22. The apparatus of claim 20, the user device is scheduled either a short transmission time interval or a long transmission time interval based in part on the channel condition and the data rate.

23. The apparatus of claim 20, wherein the interlacing structure for each user device comprises an interlace of six for a forward and a reverse link.

24. The apparatus of claim 20, wherein the interlacing structure for each user device comprises an interlace of three for a forward and a reverse link.

25. A non-transitory computer-readable medium having stored thereon computer-executable instructions for:

detecting a packet channel condition;

ascertaining a packet data rate;

scheduling a long transmission time interval or a short transmission time interval to an encoded packet based in part on the detected channel condition and the ascertained data rate; and indicating an interlacing structure from at least one of a plurality of interlacing structures for the encoded packet, wherein the interlacing structure for the encoded packet is indicated by adding an extra bit to a forward link assignment message (FLAM) or a reverse link assignment message (RLAM).

26. The non-transitory computer-readable medium of claim 25, further comprising instructions for:

scheduling a long transmission time interval if the packet channel condition is poor or the data rate is slow.

27. The non-transitory computer-readable medium of claim 26, wherein the interlacing structure for the encoded packet comprises an interlace of three for a forward and a reverse link.

28. The non-transitory computer-readable medium of claim 25, further comprising instructions for:

scheduling a short transmission time interval if the packet channel condition is good or the data rate is fast.

29. The non-transitory computer-readable medium of claim 28, wherein the interlacing structure for the encoded packet comprises an interlace of six for a forward and a reverse link.

* * * * *